United States Patent
Isoyama

(10) Patent No.: US 9,367,368 B2
(45) Date of Patent: Jun. 14, 2016

(54) EVENT PROCESSING CONTROL DEVICE, NODE DEVICE, EVENT PROCESSING SYSTEM, AND EVENT PROCESSING CONTROL METHOD

(71) Applicant: NEC Corporation, Minato-ku, Tokyo (JP)

(72) Inventor: Kazuhiko Isoyama, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/422,810

(22) PCT Filed: Aug. 23, 2013

(86) PCT No.: PCT/JP2013/004982
§ 371 (c)(1),
(2) Date: Feb. 20, 2015

(87) PCT Pub. No.: WO2014/034060
PCT Pub. Date: Mar. 6, 2014

(65) Prior Publication Data
US 2015/0242253 A1 Aug. 27, 2015

(30) Foreign Application Priority Data
Aug. 30, 2012 (JP) .................................. 2012-189903

(51) Int. Cl.
*G06F 3/00* (2006.01)
*G06F 9/44* (2006.01)
(Continued)

(52) U.S. Cl.
CPC *G06F 9/542* (2013.01); *G06F 1/14* (2013.01); *G06F 9/50* (2013.01); *G06F 9/5027* (2013.01); *G06F 13/00* (2013.01); *H04L 41/0686* (2013.01); *H04L 41/5019* (2013.01)

(58) Field of Classification Search
None
See application file for complete search history.

(56) References Cited

U.S. PATENT DOCUMENTS 7,634,595 B1 * 12/2009 Brown ................... G06F 3/061
710/7
2009/0271468 A1 10/2009 DiStefano
(Continued)

FOREIGN PATENT DOCUMENTS

EP 1785861 A2 5/2007
JP 4161998 B2 11/2006
(Continued)

OTHER PUBLICATIONS

International Search Report for PCT Application No. PCT/JP2013/004982, mailed on Nov 26, 2013.
(Continued)

*Primary Examiner* — Craig Dorais

(57) ABSTRACT

In an event processing system, a service level required for event processing is satisfied. A node information acquisition unit 110 acquires node information which includes information related to a connection destination node and performance information, from each of a plurality of nodes. Each of the plurality of nodes transfers an event or an event processing result to another connected node according to a transfer path. A node and path determination unit 120 determines a combination of an event processing node which is a node to perform the event processing and the transfer path from a source node from which an event is transmitted to a destination node to which an event processing result is transmitted, through one or more nodes including the event processing node, in such a way to satisfy a specified service level, on the basis of the node information.

30 Claims, 23 Drawing Sheets

(51) Int. Cl.
  *G06F 9/46* (2006.01)
  *G06F 13/00* (2006.01)
  *G06F 9/54* (2006.01)
  *G06F 9/50* (2006.01)
  *H04L 12/24* (2006.01)
  *G06F 1/14* (2006.01)

(56) References Cited

U.S. PATENT DOCUMENTS

2011/0252433 A1    10/2011  Isoyama
2012/0084788 A1*   4/2012   Sakamoto ............ G06F 9/5083
                                                        718/105
2015/0131479 A1*   5/2015   Fukui .................... H04L 41/12
                                                        370/254

FOREIGN PATENT DOCUMENTS

| | | |
|---|---|---|
| JP | 2007140710 A | 6/2007 |
| JP | 2009217402 A | 9/2009 |
| JP | 2011250181 A | 12/2011 |
| JP | 2012124708 A | 6/2012 |

OTHER PUBLICATIONS

Extended European Search Report for EP Application No. EP13834192.0 dated Mar. 24, 2016.

* cited by examiner

Fig. 6

501 — EVENT

| TRANSMISSION SOURCE ID | ATTRIBUTE A | ATTRIBUTE B | ... |
|---|---|---|---|
| S11 | 150 | ... | ... |

Fig. 7

502 — EVENT PROCESSING SETTING REQUEST

| 503 | PROCESSING RULE | | |
|---|---|---|---|
| | RID | PROCESSING CONDITION | PROCESSING CONTENT |
| | PR1 | CONDITION 1: 10 Events (TRANSMISSION SOURCE ID=S11) | average (CONDITION 1, A) |
| 504 | PATH INFORMATION | | |
| | TRANSMISSION DESTINATION ID | | AP1 |
| | TRANSMISSION SOURCE ID | | S11 |
| 505 | REQUIRED SERVICE LEVEL | | |
| | REQUIRED THROUGHPUT | | 50 [EVENTS/SECOND] |
| | REQUIRED RESPONSE | | 200 [MILLISECONDS] |

Fig. 8

506a — TRANSFER RULE (N11)

| TRANSFER CONDITION | TRANSFER DESTINATION |
|---|---|
| Event (TRANSMISSION SOURCE ID=S11) | N22 |

506b — TRANSFER RULE (N22)

| TRANSFER CONDITION | TRANSFER DESTINATION |
|---|---|
| Result (RID=PR1) | N31 |

506c — TRANSFER RULE (N31)

| TRANSFER CONDITION | TRANSFER DESTINATION |
|---|---|
| Result (RID=PR1) | AP1 |

Fig. 9

507 — EVENT PROCESSING RESULT

| RID | PROCESSING RESULT |
|---|---|
| PR1 | 100 |

Fig. 10

508a  NODE INFORMATION (N11)

| PROCESSING PERFORMANCE | |
|---|---|
| THROUGHPUT | 10 [EVENTS/SECOND] |
| RESPONSE | 10 [MILLISECONDS] |
| SETTABLE NUMBER OF RULES | 10 |
| TRANSFER PERFORMANCE | |
| NEXT HOP: N21, TRANSFER DELAY: 100 [MILLISECONDS] | |
| NEXT HOP: N22, TRANSFER DELAY: 20 [MILLISECONDS] | |

508b  NODE INFORMATION (N12)

| PROCESSING PERFORMANCE | |
|---|---|
| THROUGHPUT | 100 [EVENTS/SECOND] |
| RESPONSE | 10 [MILLISECONDS] |
| SETTABLE NUMBER OF RULES | 10 |
| TRANSFER PERFORMANCE | |
| NEXT HOP: N21, TRANSFER DELAY: 20 [MILLISECONDS] | |
| NEXT HOP: N22, TRANSFER DELAY: 100 [MILLISECONDS] | |

508c  NODE INFORMATION (N21)

| PROCESSING PERFORMANCE | |
|---|---|
| THROUGHPUT | 10 [EVENTS/SECOND] |
| RESPONSE | 10 [MILLISECONDS] |
| SETTABLE NUMBER OF RULES | 10 |
| TRANSFER PERFORMANCE | |
| NEXT HOP: N31, TRANSFER DELAY: 100 [MILLISECONDS] | |
| NEXT HOP: N32, TRANSFER DELAY: 20 [MILLISECONDS] | |

508d  NODE INFORMATION (N22)

| PROCESSING PERFORMANCE | |
|---|---|
| THROUGHPUT | 100 [EVENTS/SECOND] |
| RESPONSE | 10 [MILLISECONDS] |
| SETTABLE NUMBER OF RULES | 10 |
| TRANSFER PERFORMANCE | |
| NEXT HOP: N31, TRANSFER DELAY: 20 [MILLISECONDS] | |
| NEXT HOP: N32, TRANSFER DELAY: 100 [MILLISECONDS] | |

508e  NODE INFORMATION (N31)

| PROCESSING PERFORMANCE | |
|---|---|
| THROUGHPUT | 10 [EVENTS/SECOND] |
| RESPONSE | 10 [MILLISECONDS] |
| SETTABLE NUMBER OF RULES | 10 |
| TRANSFER PERFORMANCE | |
| NEXT HOP: AP1, TRANSFER DELAY: 100 [MILLISECONDS] | |
| NEXT HOP: AP2, TRANSFER DELAY: 20 [MILLISECONDS] | |

508f  NODE INFORMATION (N32)

| PROCESSING PERFORMANCE | |
|---|---|
| THROUGHPUT | 100 [EVENTS/SECOND] |
| RESPONSE | 10 [MILLISECONDS] |
| SETTABLE NUMBER OF RULES | 10 |
| TRANSFER PERFORMANCE | |
| NEXT HOP: AP1, TRANSFER DELAY: 20 [MILLISECONDS] | |
| NEXT HOP: AP2, TRANSFER DELAY: 100 [MILLISECONDS] | |

Fig. 11

509a NODE INFORMATION (S11)

| TRANSFER PERFORMANCE |
|---|
| NEXT HOP: N11, TRANSFER DELAY: 10 [MILLISECONDS] |

509b NODE INFORMATION (S12)

| TRANSFER PERFORMANCE |
|---|
| NEXT HOP: N12, TRANSFER DELAY: 10 [MILLISECONDS] |

Fig. 12

1506 LOCAL TRANSFER RULE (N22)

| TRANSFER CONDITION | TRANSFER DESTINATION |
|---|---|
| Event (TRANSMISSION SOURCE ID=S11) | N22/EP1 |

Fig. 15

| \ 502 | EVENT PROCESSING SETTING REQUEST | |
|---|---|---|
| 503 | PROCESSING RULE | |
| | RID | PROCESSING CONDITION | PROCESSING CONTENT |
| | PR1 | CONDITION 1: 10 Events (TRANSMISSION SOURCE ID=S11 or S12) | average (CONDITION 1, A) |
| 504 | PATH INFORMATION | |
| | TRANSMISSION DESTINATION ID | AP1 |
| | TRANSMISSION SOURCE ID | S11, S12 |
| 505 | REQUIRED SERVICE LEVEL | |
| | REQUIRED THROUGHPUT | 50 [EVENTS/SECOND] |
| | REQUIRED RESPONSE | 200 [MILLISECONDS] |

Fig. 16

506d — TRANSFER RULE (N11)

| TRANSFER CONDITION | TRANSFER DESTINATION |
|---|---|
| Event (TRANSMISSION SOURCE ID=S11) | N22 |

506e — TRANSFER RULE (N12)

| TRANSFER CONDITION | TRANSFER DESTINATION |
|---|---|
| Event (TRANSMISSION SOURCE ID=S12) | N22 |

506f — TRANSFER RULE (N22)

| TRANSFER CONDITION | TRANSFER DESTINATION |
|---|---|
| Result (RID=PR1) | N31 |

506g — TRANSFER RULE (N31)

| TRANSFER CONDITION | TRANSFER DESTINATION |
|---|---|
| Result (RID=PR1) | AP1 |

Fig. 18

| | EVENT PROCESSING SETTING REQUEST | |
|---|---|---|
| | PROCESSING RULE | |
| RID | PROCESSING CONDITION | PROCESSING CONTENT |
| PR1 | CONDITION 1: 10 Events (TRANSMISSION SOURCE ID=S11) and CONDITION 2: 10 Events (TRANSMISSION SOURCE ID=S12) | average (CONDITION 1, A) + average (CONDITION 2, A) |

| PATH INFORMATION | |
|---|---|
| TRANSMISSION DESTINATION ID | AP1 |
| TRANSMISSION SOURCE ID | S11, S12 |

| REQUIRED SERVICE LEVEL | |
|---|---|
| REQUIRED THROUGHPUT | 50 [EVENTS/SECOND] |
| REQUIRED RESPONSE | 200 [MILLISECONDS] |

| | DIVIDED PROCESSING RULE | |
|---|---|---|
| RID | PROCESSING CONDITION | PROCESSING CONTENT |
| PR101 | CONDITION 1: 10 Events (TRANSMISSION SOURCE ID=S11) | average (CONDITION 1, A) |

| | DIVIDED PROCESSING RULE | |
|---|---|---|
| RID | PROCESSING CONDITION | PROCESSING CONTENT |
| PR102 | CONDITION 1: 10 Events (TRANSMISSION SOURCE ID=S12) | average (CONDITION 1, A) |

| | DIVIDED PROCESSING RULE | |
|---|---|---|
| RID | PROCESSING CONDITION | PROCESSING CONTENT |
| PR201 | CONDITION 1: Result(RID=101) and CONDITION 2: Result(RID=102) | value (CONDITION 1) + value (CONDITION 2) |

Fig. 19

506h — TRANSFER RULE (N11)

| TRANSFER CONDITION | TRANSFER DESTINATION |
|---|---|
| Result (RID=PR101) | N22 |

506i — TRANSFER RULE (N12)

| TRANSFER CONDITION | TRANSFER DESTINATION |
|---|---|
| Result (RID=PR102) | N22 |

506j — TRANSFER RULE (N22)

| TRANSFER CONDITION | TRANSFER DESTINATION |
|---|---|
| Result (RID=PR103) | N31 |

506k — TRANSFER RULE (N31)

| TRANSFER CONDITION | TRANSFER DESTINATION |
|---|---|
| Result (RID=PR103) | AP1 |

Fig. 20

1506a — LOCAL TRANSFER RULE (N11)

| TRANSFER CONDITION | TRANSFER DESTINATION |
|---|---|
| Event (TRANSMISSION SOURCE ID=S11) | N11/EP1 |

1506b — LOCAL TRANSFER RULE (N12)

| TRANSFER CONDITION | TRANSFER DESTINATION |
|---|---|
| Event (TRANSMISSION SOURCE ID=S12) | N12/EP1 |

1506c — LOCAL TRANSFER RULE (N22)

| TRANSFER CONDITION | TRANSFER DESTINATION |
|---|---|
| Result (RID=PR101) | N22/EP1 |
| Result (RID=PR102) | N22/EP1 |

Fig. 22

1506a — LOCAL TRANSFER RULE (N11)

| TRANSFER CONDITION | TRANSFER DESTINATION |
|---|---|
| Event (0≦ATTRIBUTE A<100) | N11/EP1 |

1506b — LOCAL TRANSFER RULE (N12)

| TRANSFER CONDITION | TRANSFER DESTINATION |
|---|---|
| Event (200≦ATTRIBUTE A<300) | N12/EP1 |

1506c — LOCAL TRANSFER RULE (N22)

| TRANSFER CONDITION | TRANSFER DESTINATION |
|---|---|
| Result (RID=PR101) | N22/EP1 |
| Result (RID=PR102) | N22/EP1 |

Fig. 24

508a NODE INFORMATION (N11)

| PLACEMENT INFORMATION | |
|---|---|
| HIERARCHICAL LEVEL TYPE | TERMINAL |
| MOVING AREA | D |
| PROCESSING PERFORMANCE | |
| THROUGHPUT | 10 [EVENTS/SECOND] |
| RESPONSE | 10 [MILLISECONDS] |
| SETTABLE NUMBER OF RULES | 10 |
| TRANSFER PERFORMANCE | |
| NEXT HOP: BASE STATION, TRANSFER DELAY: 40 [MILLISECONDS] | |

508b NODE INFORMATION (N12)

| PLACEMENT INFORMATION | |
|---|---|
| HIERARCHICAL LEVEL TYPE | TERMINAL |
| MOVING AREA | E |
| PROCESSING PERFORMANCE | |
| THROUGHPUT | 100 [EVENTS/SECOND] |
| RESPONSE | 10 [MILLISECONDS] |
| SETTABLE NUMBER OF RULES | 10 |
| TRANSFER PERFORMANCE | |
| NEXT HOP: BASE STATION, TRANSFER DELAY: 40 [MILLISECONDS] | |

508c NODE INFORMATION (N21)

| PLACEMENT INFORMATION | |
|---|---|
| HIERARCHICAL LEVEL TYPE | BASE STATION |
| COVER AREA | A, B, C |
| PROCESSING PERFORMANCE | |
| THROUGHPUT | 10 [EVENTS/SECOND] |
| RESPONSE | 10 [MILLISECONDS] |
| SETTABLE NUMBER OF RULES | 10 |
| TRANSFER PERFORMANCE | |
| NEXT HOP: N31, TRANSFER DELAY: 100 [MILLISECONDS] | |
| NEXT HOP: N32, TRANSFER DELAY: 20 [MILLISECONDS] | |

508d NODE INFORMATION (N22)

| PLACEMENT INFORMATION | |
|---|---|
| HIERARCHICAL LEVEL TYPE | BASE STATION |
| COVER AREA | D, E, F |
| PROCESSING PERFORMANCE | |
| THROUGHPUT | 100 [EVENTS/SECOND] |
| RESPONSE | 10 [MILLISECONDS] |
| SETTABLE NUMBER OF RULES | 10 |
| TRANSFER PERFORMANCE | |
| NEXT HOP: N31, TRANSFER DELAY: 20 [MILLISECONDS] | |
| NEXT HOP: N32, TRANSFER DELAY: 100 [MILLISECONDS] | |

508e NODE INFORMATION (N31)

| PLACEMENT INFORMATION | |
|---|---|
| HIERARCHICAL LEVEL TYPE | CLOUD |
| PROCESSING PERFORMANCE | |
| THROUGHPUT | 10 [EVENTS/SECOND] |
| RESPONSE | 10 [MILLISECONDS] |
| SETTABLE NUMBER OF RULES | 10 |
| TRANSFER PERFORMANCE | |
| NEXT HOP: AP1, TRANSFER DELAY: 100 [MILLISECONDS] | |
| NEXT HOP: AP2, TRANSFER DELAY: 20 [MILLISECONDS] | |

508f NODE INFORMATION (N32)

| PLACEMENT INFORMATION | |
|---|---|
| HIERARCHICAL LEVEL TYPE | CLOUD |
| PROCESSING PERFORMANCE | |
| THROUGHPUT | 100 [EVENTS/SECOND] |
| RESPONSE | 10 [MILLISECONDS] |
| SETTABLE NUMBER OF RULES | 10 |
| TRANSFER PERFORMANCE | |
| NEXT HOP: AP1, TRANSFER DELAY: 20 [MILLISECONDS] | |
| NEXT HOP: AP2, TRANSFER DELAY: 100 [MILLISECONDS] | |

EVENT PROCESSING CONTROL DEVICE, NODE DEVICE, EVENT PROCESSING SYSTEM, AND EVENT PROCESSING CONTROL METHOD

This application is a National Stage Entry of PCT/JP2013/004982 filed on Aug. 23, 2013, which claims priority from Japanese Patent Application 2012-189903 filed on Aug. 30, 2012, the contents of all of which are incorporated herein by reference, in their entirety.

TECHNICAL FIELD

The present invention relates to an event processing control device, a node device, an event processing system, and an event processing control method.

BACKGROUND ART

PTL 1 discloses an example of complex event processing (CEP), which processes a great number of various events occurring in devices and the like.

The load distribution system according to PTL 1 includes multiple event processing devices (event processing servers), a transfer device (distributor), and an event processing control device (event processing distribution control unit). The event processing control device sets processing rules each including a processing condition and a processing content of event processing, in the event processing devices. Here, the event processing control device sets processing rules having the same processing condition, in the same event processing device. The event processing control device also generates such a transfer rule (distribution rule) that events necessary for the corresponding event processing would be transferred to each event processing device, and sets the transfer rule in the transfer device. The transfer device transfers each received event to a corresponding one of the event processing device on the basis of the set transfer rule.

PTL 2 discloses an example of a technique for reducing delay in transferring events and event processing results in a load distribution system as that of PTL 1. In the event processing system according to PTL 2, processing rules are set in an event processing device which is close to an application to which an event processing result is to be transmitted. Meanwhile, an event is transmitted to a transfer device close to the event occurring source, from which the event is transferred.

CITATION LIST

Patent Literature

[PTL 1] Japanese Patent Publication No. 4161998
[PTL 2] Japanese Patent Application Publication No. 2009-217402

SUMMARY OF INVENTION

Technical Problem

In a complex event processing system, an SLA (service level agreement), which specifies the service level such as required throughput, required response, and the like, for event processing is set by a user or the like. However, the service level specified by an SLA cannot be ensured only by performing event processing by an event processing device close to a corresponding application as in the system described in PTL 2.

The present invention aims to solve the above-described problem by providing an event processing control device, a node device, an event processing system, and an event processing control method which are capable of satisfying the service level required for event processing.

Solution to Problem

An event processing control device according to an exemplary aspect of the invention includes: a node information acquisition means for acquiring node information which includes information related to a connection destination node and performance information, from each of a plurality of nodes, the plurality of nodes each transferring an event or an event processing result to another connected node according to a transfer path, the plurality of nodes including one or more nodes each being able to perform event processing in which a received event is processed and an event processing result is generated; and a node and path determination means for determining a combination of an event processing node which is a node to perform the event processing and the transfer path from a source node from which an event is transmitted to a destination node to which an event processing result is transmitted, through one or more nodes including the event processing node, in such a way to satisfy a specified service level, on the basis of the node information.

A node device according to an exemplary aspect of the invention, which is selected as an event processing node by an event processing control device, includes: a processing means for performing event processing in which an event is processed and an event processing result is generated; and a transfer means for transferring the generated event processing result to another connected node according to a transfer path, measuring first delay time, inserting a time stamp used by a transmission destination node for measuring second delay time to the generated event processing result, measuring throughput of the event processing by the processing means, and transmitting a measured value of the first delay time and a measured value of the throughput of the event processing to an event processing control device, wherein the event processing control device determines a combination of the event processing node which is a node to perform an event processing and the transfer path from a source node from which an event is transmitted to a destination node to which an event processing result is transmitted, through one or more nodes including the event processing node, in such a way to satisfy a service level in which at least one of required response and required throughput of an event processing is specified, and performs at least one of monitoring whether a measured value of the delay time of the transfer path is equal to or smaller than the required response, and monitoring whether a measured value of the throughput of the event processing measured by the event processing node is equal to or greater than the required throughput, the measured value of the delay time being calculated by using the measured value of the first delay time which is delay time of a path from the transmission source node to the event processing node and the second measured value of delay time which is delay time of a path from the event processing node to the transmission destination node. An event processing system according to an exemplary aspect of the invention includes: a plurality of nodes which each transfer an event or an event processing result to another connected node according to a transfer path, the plurality of nodes including one or more nodes each being able to perform event processing in which a received event is processed and an event processing result is generated; and an event processing control device which acquires node information which includes information related to a connection destination node and performance information, from each of the plurality of nodes, and determines a combination of an event processing node which is a node to perform the event processing and the transfer path from a source node from which an event is transmitted to a destination node to which an event processing result is transmitted, through one or more nodes including the event processing node, in such a way to satisfy a specified service level, on the basis of the node information.

An event processing control method according to an exemplary aspect of the invention includes: acquiring node information which includes information related to a connection destination node and performance information, from each of a plurality of nodes, the plurality of nodes each transferring an event or an event processing result to another connected node according to a transfer path, the plurality of nodes including one or more nodes each being able to perform event processing in which a received event is processed and an event processing result is generated; and determining a combination of an event processing node which is a node to perform the event processing and the transfer path from a source node from which an event is transmitted to a destination node to which an event processing result is transmitted, through one or more nodes including the event processing node, in such a way to satisfy a specified service level, on the basis of the node information.

A computer readable storage medium according to an exemplary aspect of the invention, records thereon a program, causing a computer to perform a method including: acquiring node information which includes information related to a connection destination node and performance information, from each of a plurality of nodes, the plurality of nodes each transferring an event or an event processing result to another connected node according to a transfer path, the plurality of nodes including one or more nodes each being able to perform event processing in which a received event is processed and an event processing result is generated; and determining a combination of an event processing node which is a node to perform the event processing and the transfer path from a source node from which an event is transmitted to a destination node to which an event processing result is transmitted, through one or more nodes including the event processing node, in such a way to satisfy a specified service level, on the basis of the node information.

Advantageous Effects of Invention

The advantageous effect of the present invention is to be able to satisfy the service level required for event processing in an event processing system.

BRIEF DESCRIPTION OF DRAWINGS

FIG. 6 is a table illustrating an example of an event 501 in the first exemplary embodiment of the present invention.

FIG. 7 is a table illustrating an example of an event processing setting request 502 in the first exemplary embodiment of the present invention.

FIG. 8 provides tables each illustrating an example of a transfer rule 506 in the first exemplary embodiment of the present invention.

FIG. 9 is a table illustrating an example of an event processing result 507 in the first exemplary embodiment of the present invention.

FIG. 10 provides tables each illustrating an example of node information 508 in the first exemplary embodiment of the present invention.

FIG. 11 provides tables each illustrating an example of node information 509 in the first exemplary embodiment of the present invention.

FIG. 12 is a table illustrating a local transfer rule 1506 in the first exemplary embodiment of the present invention.

FIG. 15 is a table illustrating another example of the event processing setting request 502 in the first exemplary embodiment of the present invention.

FIG. 16 provides tables each illustrating another example of the transfer rule 506 in the first exemplary embodiment of the present invention.

FIG. 18 is a diagram illustrating another example of the event processing setting request 502 in the first exemplary embodiment of the present invention.

FIG. 19 provides tables each illustrating another example of the transfer rule 506 in the first exemplary embodiment of the present invention.

FIG. 20 provides tables each illustrating another example of the local transfer rule 1506 in the first exemplary embodiment of the present invention.

FIG. 22 provides tables each illustrating another example of the local transfer rule 1506 in the first exemplary embodiment of the present invention.

FIG. 24 provides tables each illustrating an example of node information 508 in the second exemplary embodiment of the present invention.

DESCRIPTION OF EMBODIMENTS (First Exemplary Embodiment)

Next, a first exemplary embodiment of the present invention will be described.

First, description will be given of a configuration of the first exemplary embodiment of the present invention.

Figure 2:
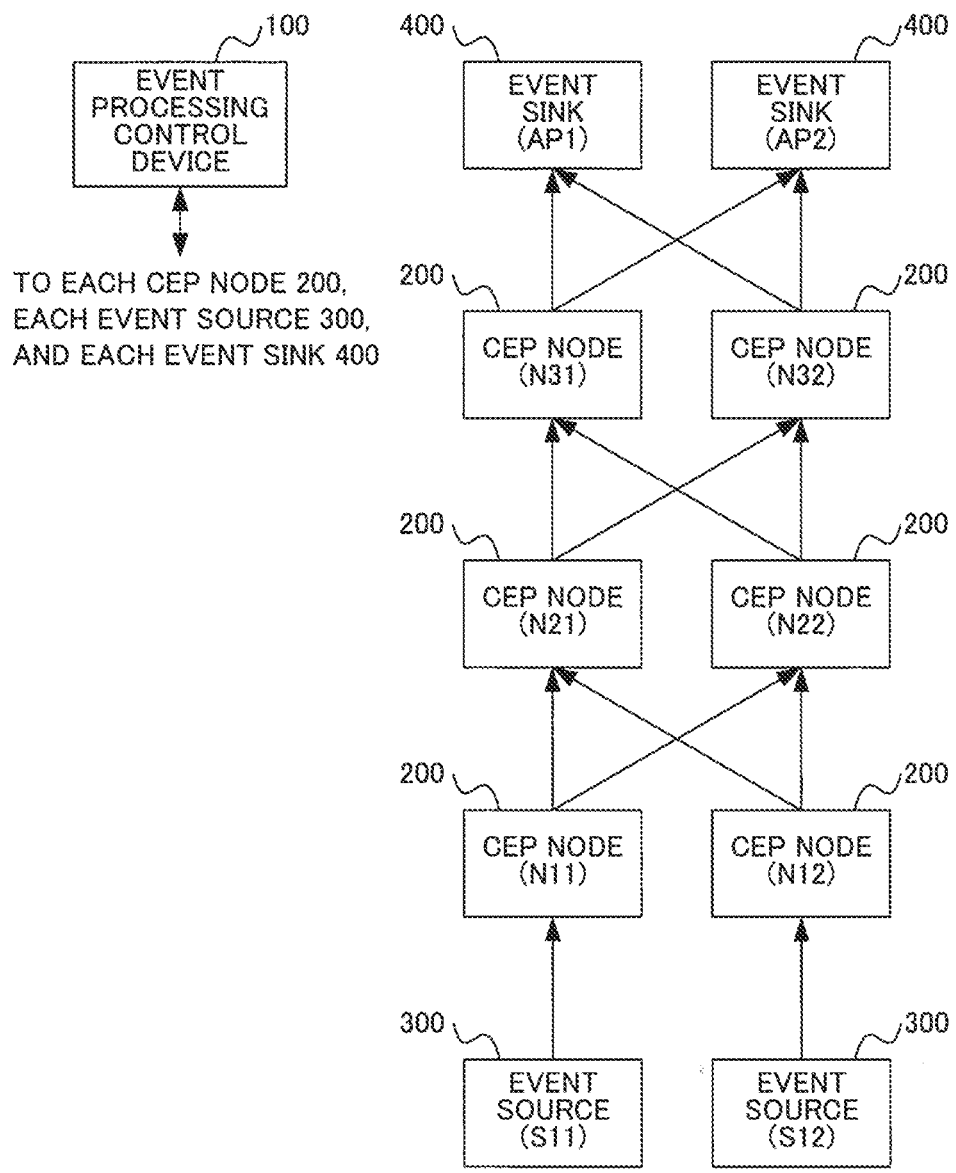
FIG. 2 is a block diagram illustrating a configuration of an event processing system in the first exemplary embodiment of the present invention.

FIG. 2 is a block diagram illustrating a configuration of an event processing system in the first exemplary embodiment of the present invention. With reference to FIG. 2, the event processing system of the first exemplary embodiment of the present invention includes an event processing control device 100, multiple CEP nodes 200, event sources 300, and event sinks 400. In the following, the CEP nodes 200, the event sources 300, and the event sinks 400 will be referred to as nodes collectively.

Each of the CEP nodes 200 is connected to one or more other nodes, and thereby forms a network for transferring events 501 and event processing results 507. In the following, the events 501 and the event processing results 507 will be referred to as event data collectively.

In the example in FIG. 2, the event sources 300 having the node identifications (node IDs) "S11" and "S12" are connected to the respective CEP nodes 200 having the node IDs "N11" and "N12". The CEP nodes 200 having the node IDs "N11" and "N12" are each connected to the CEP nodes 200 having the node IDs "N21" and "N22". The CEP nodes 200 having the node IDs "N21" and "N22" are each connected to the CEP nodes 200 having node IDs "N31" and "N32". The CEP nodes 200 having the node IDs "N31" and "N32" are each connected to the event sinks 400 having the node IDs "AP1" and "AP2".

Note that each of the CEP nodes 200 and at least the event source 300 or the event sink 400 connected to the CEP node 200 may be included in the same device such as a mobile terminal.

Each of the event sources 300 is, for example, a sensor or an information reader, and detects a predetermined kind of information and then transmits the event 501 including the detected information to the corresponding CEP node 200. Alternatively, the event source 300 may be a contactless-type or contact-type information reader such as an RFID reader or a magnetic card reader, for example. Alternatively, the event source 300 may be a sensor which detects weather information such as temperature or air pressure. Alternatively, the event source 300 may be a sensor which detects positional information of a mobile terminal or the like.

FIG. 6 is a table illustrating an example of the event 501 in the first exemplary embodiment of the present invention. In the example in FIG. 6, the event 501 includes, as attributes, a "transmission source ID", which is the node ID of the event source 300 which transmitted the event 501, and "attribute A", "attribute B", and the like, which are detected pieces of information.

Each of the event sinks 400 is an application server in which an application, which uses the event processing result 507 and which is executed by a user or the like, operates, for example. The event sink 400 transmits an event processing setting request 502 to the event processing control device 100. The event sink 400 also receives the event processing result 507 from each corresponding CEP node 200.

FIG. 7 is a table illustrating an example of the event processing setting request 502 in the first exemplary embodiment of the present invention. The event processing setting request 502 includes a processing rule 503, path information 504, and a required service level 505.

Here, the processing rule 503 includes a processing rule identification (a processing rule ID or an RID), a processing condition, and a processing content. The processing condition indicates a condition related to the event 501 to be processed. The processing content indicates a process to be performed when the processing condition is satisfied.

In the example in FIG. 7, a processing condition "Condition 1: 10 Events (transmission source ID=S11)" and a processing content "average (Condition 1, A)" are set in the processing rule 503. The Condition 1 "10 Events (transmission source ID=S11)" indicates that ten events 501 satisfying the condition specified in the parentheses are received. The processing content "average (Condition 1, A)" indicates that the average value of Attribute A of the events 501 related to Condition 1 (ten events 501 with transmission source ID=S11) is calculated.

The path information 504 includes a transmission destination ID and a transmission source ID. Here, the node ID of the event sink 400 which transmitted the event processing setting request 502 (to which the event processing result 507 is to be transmitted) is set as the transmission destination ID. The transmission source ID of the event 501 to be processed is set as the transmission source ID. Note that, the event processing control device 100 may set the transmission source ID on the basis of the processing condition in the processing rule 503.

The required service level 505 indicates a service level set by a user or the like and required for the event processing. The required service level 505 includes required throughput and required response. Here, the required throughput indicates a throughput required for the event processing specified in the processing rule 503. The required response indicates the response time required for the event processing specified in the processing rule 503. The required throughput is specified with the lower limit of the number of events to be processed per unit time in the event processing system, for example. The required response is specified with the upper limit of time from when the event 501 is transmitted by the event source 300 to when the event processing result 507 is received by the event sink 400. When the event processing specified in the processing rule 503 is a process related to multiple events 501, the response time may correspond to time from when the last event 501 necessary for the event processing is transmitted by the event source 300 to when the event processing result 507 is received by the event sink 400.

The event processing control device 100 receives the event processing setting request 502 from the event sink 400 and determines a path (transfer path) for transferring event data and a CEP node 200 to perform the event processing (event processing node), so as to satisfy the service level. The event processing control device 100 sets the processing rule 503 in the event processing node. In addition, the event processing control device 100 sets a transfer rule 506 according to the transfer path, in each of the CEP nodes 200 on the transfer path.

FIG. 8 provides tables each illustrating an example of the transfer rule 506 (506a, b, . . . ) in the first exemplary embodiment of the present invention. The transfer rule 506 includes a transfer condition and a transfer destination. Here, the transfer condition indicates a condition related to event data to be transferred to another node. The transfer destination indicates another node to which event data satisfying the transfer condition is to be transferred.

In the transfer rule 506 in FIG. 8, "Event ( )" in the transfer condition indicates the event 501 satisfying the condition specified in the parentheses. "Result ( )" in the transfer condition indicates the event processing result 507 satisfying the condition specified in the parentheses.

Each CEP node 200 transfers event data to the transfer destination according to the transfer rule 506. The CEP node 200 processes the received event 501 according to the processing rule 503, and generates the event processing result 507.

FIG. 9 is a table illustrating an example of the event processing result 507 in the first exemplary embodiment of the present invention. In the example in FIG. 9, the event processing result 507 includes "RID" and "processing result" as attributes.

Figure 3:
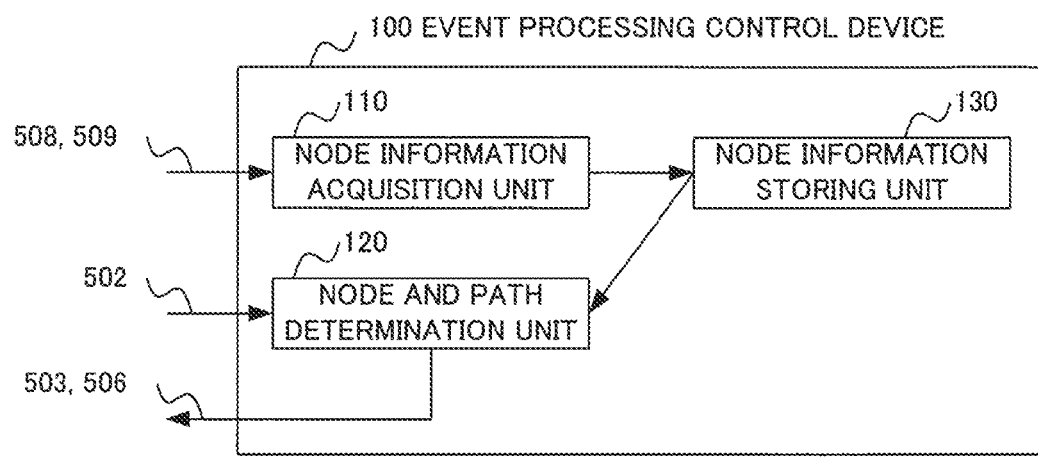
FIG. 3 is a block diagram illustrating a configuration of an event processing control device 100 in the first exemplary embodiment of the present invention.

FIG. 3 is a block diagram illustrating a configuration of the event processing control device 100 in the first exemplary embodiment of the present invention. With reference to FIG. 3, the event processing control device 100 includes a node information acquisition unit 110, a node and path determination unit 120, and a node information storing unit 130.

The node information acquisition unit 110 acquires a piece of node information 508 from each of the CEP nodes 200 and a piece of node information 509 from each of the event sources 300, and stores the acquired pieces of node information 508 and node information 509 in the node information storage unit 130. The node information storing unit 130 stores the acquired pieces of node information 508 and node information 509.

FIG. 10 provides tables each illustrating an example of the node information 508 (508a, b, . . . ) in the first exemplary embodiment of the present invention. Each piece of the node information 508 includes processing performance and transfer performance as performance information of the corresponding CEP node 200.

The processing performance indicates performance related to the event processing in the CEP node 200. In the example in FIG. 10, the processing performance includes throughput, response, and the settable number of rules. Here, the throughput and the response indicate throughput and response time of a processing unit 220 of the CEP node 200, respectively. The settable number of rules indicates the maximum number of processing rules with which the throughput and the response can be ensured.

The throughput is indicated by the number of events which can be processed by the processing unit 220 per unit time, for example. The response is indicated by time from when the processing unit 220 of the CEP node 200 receives the event 501 to when the processing unit 220 transmits the event processing result 507. When the event processing specified in the processing rule 503 is a process related to multiple events 501, the response time may be time from when the processing unit 220 receives the last event 501 necessary for the event processing to when the processing unit 220 transmits the event processing result 507.

The transfer performance indicates performance related to transfer of event data to another node connected to the CEP node 200. In the example in FIG. 10, the transfer performance includes one or more combinations of a next hop and transfer delay. Here, a next hop indicates a node ID of another node to which a transfer unit 230 of the CEP node 200 can transfer event data. Transfer delay indicates time from when the transfer unit 230 transmits event data to when the event data arrives at the node indicated as the next hop. A next hop is also used as connection information indicating another node to which the CEP node 200 is connected.

In case that the CEP node 200 does not include the processing unit 220 (does not perform event processing), the node information 508 may not need to include processing performance.

FIG. 11 provides tables each illustrating an example of the node information 509 (509a, b, . . . ) in the first exemplary embodiment of the present invention. Each piece of the node information 509 includes transfer performance as performance information of the corresponding event source 300. The transfer performance, as the transfer performance in each piece of the node information 508, indicates performance related to transfer of event data to another node connected to the event source 300.

It is assumed that the pieces of node information 508 and node information 509 are preset in the CEP nodes 200 and the event source nodes 300 by a manager or the like.

The node and path determination unit 120 determines the CEP node 200 which is to perform the event processing (event processing node) and the path in which the event data is to be transferred (transfer path), on the basis of the acquired pieces of node information 508 and node information 509. The node and path determination unit 120 also sets the processing rule 503 in the determined event processing node. The node and path determination unit 120 further sets the transfer rule 506 according to the transfer path, in each of the CEP nodes 200 on the determined transfer path.

Figure 4:
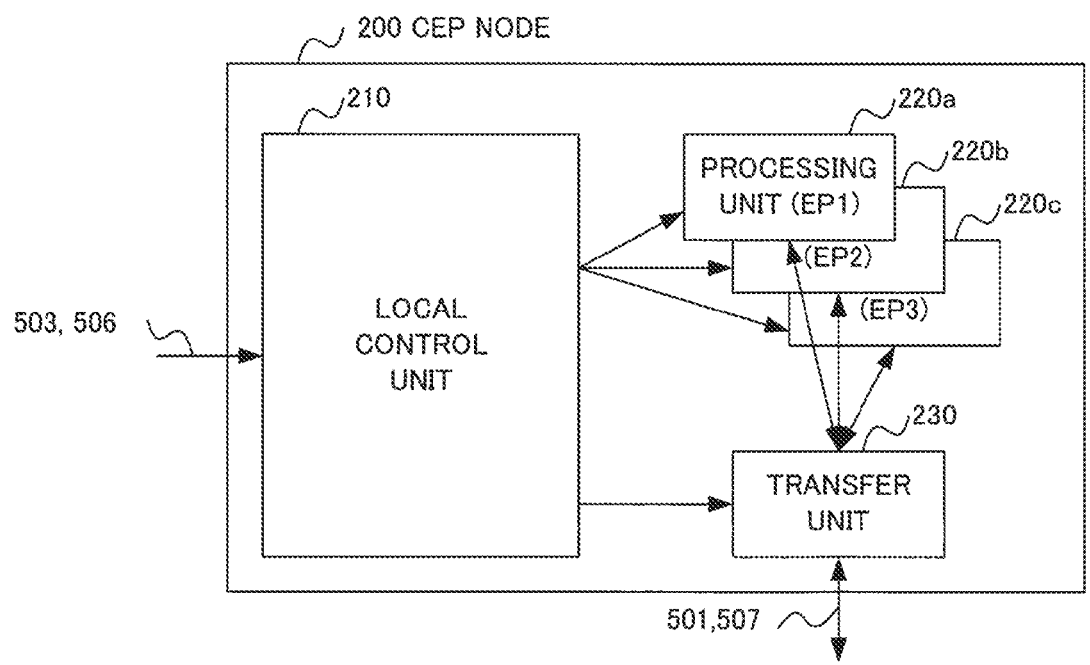
FIG. 4 is a block diagram illustrating a configuration of a CEP node 200 in the first exemplary embodiment of the present invention.
Figure 5:
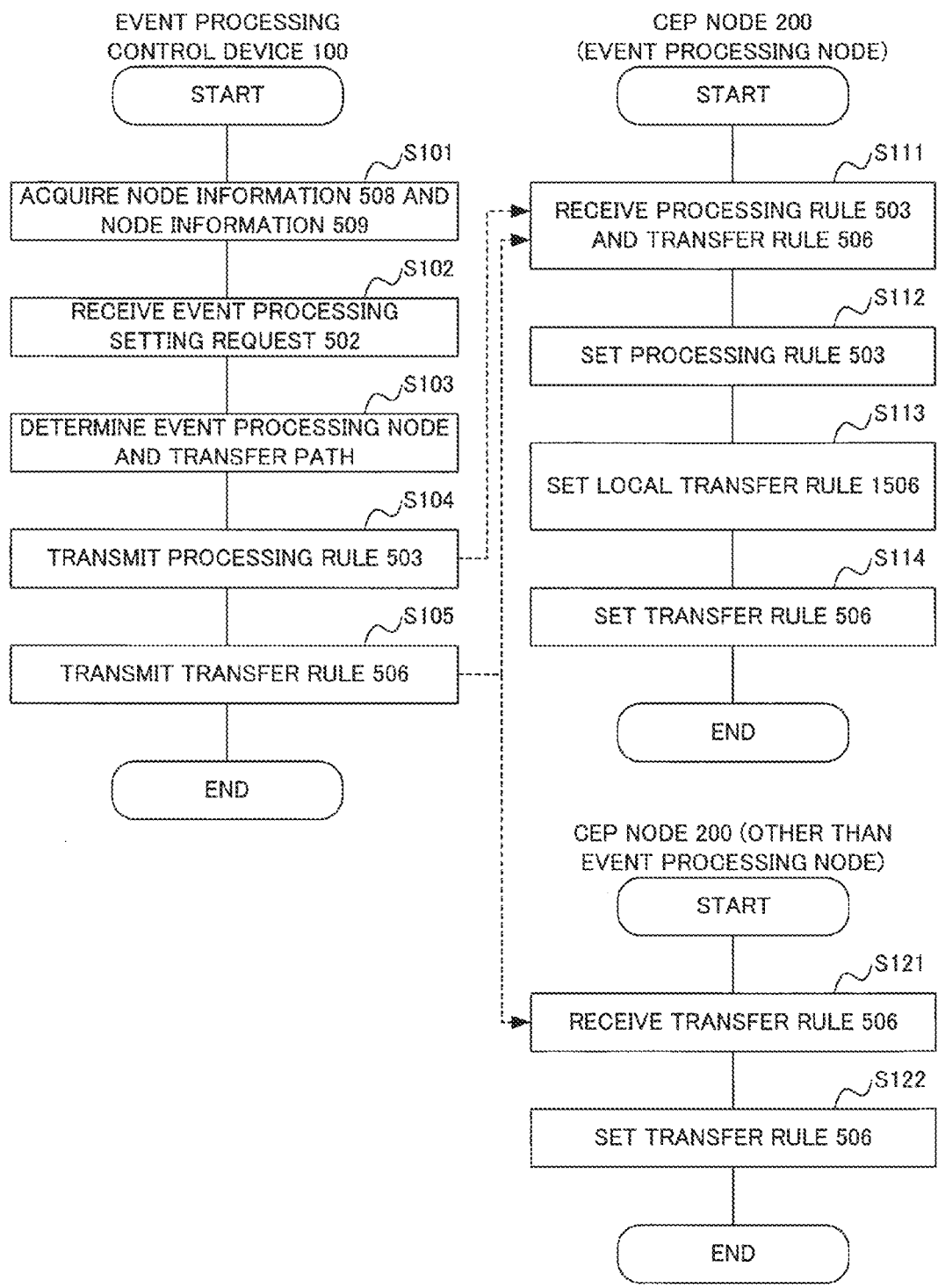
FIG. 5 is a flowchart illustrating a rule setting process in the first exemplary embodiment of the present invention.

FIG. 4 is a block diagram illustrating a configuration of each CEP node 200 in the first exemplary embodiment of the present invention. With reference to FIG. 4, the CEP node 200 includes a local control unit 210, one or more processing units 220 (220a, b, . . . ), and the transfer unit 230.

The local control unit 210 sets the processing rule 503 received from the event processing control device 100, in the processing units 220. The local control unit 210 also generates a local transfer rule 1506 for transferring received event data to the processing units 220, on the basis of the processing rule 503, and sets the local transfer rule 1506 in the transfer unit 230. The local control unit 210 sets the transfer rule 506 received from the event processing control device 100, in the transfer unit 230.

FIG. 12 is a table illustrating an example of the local transfer rule 1506 in the first exemplary embodiment of the present invention. The local transfer rule 1506, as the transfer rule 506, includes a transfer condition and a transfer destination. Here, the transfer condition indicates a condition related to event data to be transferred to the processing unit 220. The transfer destination indicates the processing unit 220 to which event data satisfying the transfer condition is transferred.

Each of the processing units 220 performs event processing according to the processing rule 503.

The transfer unit 230 transfers event data to another node according to the transfer rule 506. The transfer unit 230 also transfers event data to a corresponding one of the processing units 220 according to the local transfer rule 1506.

The event processing control device 100 and the CEP nodes 200 may each be an information processing device which is operated under program control. Moreover, the local control unit 210, the processing units 220, and the transfer unit 230 in each of the CEP nodes 200 may each be an information processing device which is operated under program control.

Next, operation of the event processing system in the first exemplary embodiment of the present invention will be described with concrete examples.

First, description will be given of a rule setting process in the first exemplary embodiment of the present invention. FIG.

5 is a flowchart illustrating the rule setting process in the first exemplary embodiment of the present invention.

The node information acquisition unit 110 of the event processing control device 100 acquires pieces of node information 508 and node information 509 from the CEP nodes 200 and the event sources 300 (Step S101). The node information acquisition unit 110 stores the acquired pieces of node information 508 and node information 509 in the node information storing unit 130.

For example, the node information acquisition unit 110 acquires pieces of node information 508a to f in FIG. 10, from the CEP nodes 200 having the node IDs "N11", "N12", "N21", "N22", "N31", and "N32". Moreover, the node information acquisition unit 110 acquires pieces of node information 509a and b in FIG. 11, from the event sources 300 having the node IDs "S11" and "S12".

Then, the node and path determination unit 120 receives the event processing setting request 502 from one of the event sinks 400 (Step S102).

For example, the node and path determination unit 120 receives the event processing setting request 502 in FIG. 7, from the event sink 400 having the node ID "AP1".

Then, the node and path determination unit 120 determines a combination of the CEP node 200 to perform event processing (event processing node) and a path in which event data is to be transferred (transfer path), so as to satisfy the required service level 505 (Step S103).

In this step, the node and path determination unit 120 extracts a combination of a path (candidate path) from the event source 300 specified using the transmission source ID to the event sink 400 specified using the transmission destination ID in the path information 504, and the CEP node 200 (candidate node) included in the path and having the number of set rules smaller than the settable number of rules, on the basis of the pieces of node information 508 and node information 509. When the throughput of the candidate node is equal to or higher than the required throughput specified as the required service level 505 and the total of the sum of the transfer delays of the respective nodes on the candidate path and the response of the candidate node (total delay time) in the combination is equal to or smaller than the required response specified as the required service level 505, the node and path determination unit 120 determines the combination of the candidate path and the candidate node, as the combination of a transfer path and an event processing node.

Figure 13:
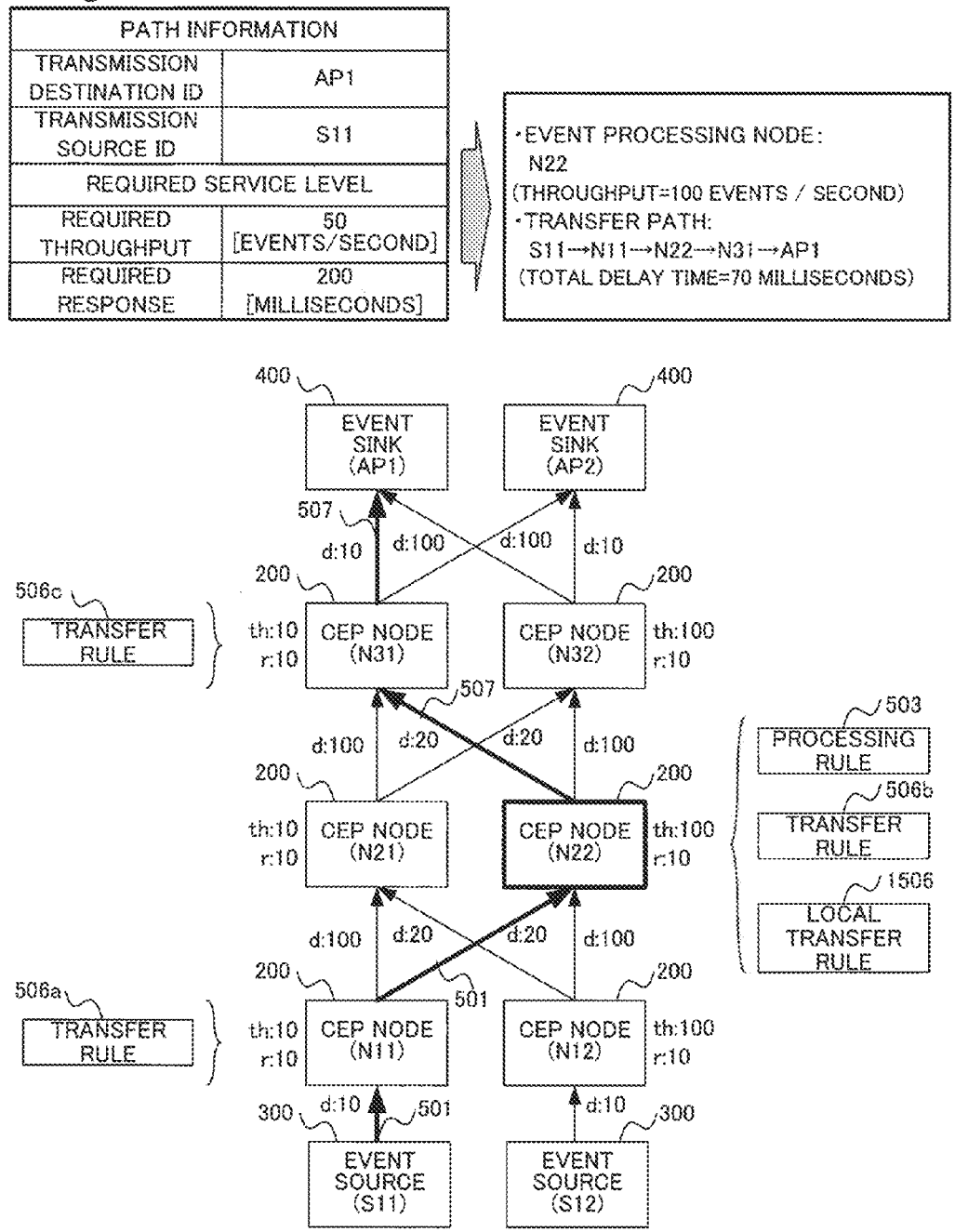
FIG. 13 is a diagram illustrating an example of a result of determination of an event processing node and a transfer path in the first exemplary embodiment of the present invention.

FIG. 13 is a diagram illustrating an example of a result of determination of an event processing node and a transfer path in the first exemplary embodiment of the present invention. In FIG. 13, "d:*" denotes delay in transfer from the corresponding node to the next hop, "th:*" denotes the throughput of the corresponding node, and "r:*" denotes the response of the corresponding node. The transfer delay, the throughput, and the response of each node in relation to the pieces of node information 508a to f and 509a and b in FIG. 10 and FIG. 11 are presented as in FIG. 13.

For example, in FIG. 13, when the CEP node 200 having the node ID "N22" is determined as a candidate node in the candidate path including the node IDs "S11", "N11", "N22", "N31", and then "AP1", the throughput of the candidate node "100 events/second" is equal to or greater than the required throughput "50 events/second" and the total delay time "70 milliseconds" is equal to or smaller than the required response "200 milliseconds". Hence, the node and path determination unit 120 determines the combination of the path including the node IDs "S11", "N11", "N22", "N31", and then "AP1" and the CEP node 200 having the node ID "N22", as the combination of a transfer path and an event processing node.

When there are multiple combinations of a candidate path and a candidate node which satisfy the required service level 505, the node and path determination unit 120 may determine the combination of a candidate path and a candidate node which is the closest to the corresponding event source 300, as the combination of a transfer path and an event processing node. This can reduce the traffic amount on the network formed by the CEP nodes 200, when the number of event processing results 507 generated by the event processing is smaller than the number of events 501 to be processed, e.g., when the average value of the multiple events 501 is to be calculated.

When there is no candidate path or candidate node which satisfies the required service level 505, the node and path determination unit 120 may transmit an error response to the event processing setting request 502, to the corresponding event sink 400.

The node and path determination unit 120 may output the determined combination of a transfer path and an event node to other devices each of which sets the processing rule 503 or the transfer rule 506.

Then, the node and path determination unit 120 transmits (sets) the processing rule 503 to the event processing node (Step S104).

For example, the node and path determination unit 120 transmits the processing rule 503 in FIG. 7 to the CEP node 200 having the node ID "N22".

The node and path determination unit 120 generates the transfer rule 506 to be set in each of the CEP nodes 200 on the transfer path, and transmits (sets) the transfer rule 506 to the CEP nodes 200 (Step S105).

In this step, the node and path determination unit 120 sets the condition of the event 501 which matches the processing condition in the processing rule 503, as the transfer condition in the transfer rule 506 in the CEP nodes 200 between the event source 300 and the event processing node on the transfer path. Moreover, the node and path determination unit 120 sets the node ID of the next node on the transfer path, as the transfer destination.

For example, the node and path determination unit 120 transmits the transfer rule 506a in FIG. 8 to the CEP node 200 having the node ID "N11".

The node and path determination unit 120 sets the processing rule ID of the processing rule 503 as the transfer condition in the transfer rule 506 in the event processing node and the CEP nodes 200 between the event processing node and the event sink 400 on the transfer path. Moreover, the node and path determination unit 120 sets the node ID of the next node on the transfer path, as the transfer destination.

For example, the node and path determination unit 120 transmits the transfer rules 506b and c in FIG. 8 to the CEP nodes 200 having the node IDs "N22" and "N31".

Then, the local control unit 210 of the CEP node 200 which is the event processing node receives the processing rule 503 and the transfer rule 506 from the event processing control device 100 (Step S111).

For example, the local control unit 210 of the CEP node 200 having the node ID "N22" receives the processing rule 503 in FIG. 7 and the transfer rule 506b in FIG. 8.

The local control unit 210 determines the processing unit 220 in which the received processing rule 503 is to be set, and transmits (sets) the processing rule 503 to the processing unit 220 (Step S112). In this step, the local control unit 210 may determine the processing unit 220 so that the load would be equally distributed to the processing units 220, or may determine the processing unit 220 so that the processing rules 503 including the same processing condition would be set in the same processing unit 220 as described in PTL 1.

For example, the local control unit 210 sets the processing rule 503 in the processing unit 220 having the processing unit ID "EP1".

In addition, the local control unit 210 generates the local transfer rule 1506, and transmits (sets) the local transfer rule 1506 to the transfer unit 230 (Step S113). In this step, the local control unit 210 sets the condition of the event 501 matching the processing condition in the processing rule 503, as the transfer condition of the local transfer rule 1506. The local control unit 210 sets the processing unit ID of the processing unit 220 in which the processing rule 503 is set, as the transfer destination.

For example, the local control unit 210 sets the local transfer rule 1506 in FIG. 12, in the transfer unit 230.

Further, the local control unit 210 transmits (sets) the received transfer rule 506 to the transfer unit 230 (Step S114).

For example, the local control unit 210 sets the transfer rule 506b, in FIG. 8 in the transfer unit 230.

Then, the local control unit 210 of each of the CEP nodes 200 other than the event processing node receives the transfer rule 506 from the event processing control device 100 (Step S121). The local control unit 210 transmits (sets) the received transfer rule 506 to the transfer unit 230 (Step S122).

For example, the local control unit 210 of the CEP node 200 having the node ID "N11" sets the transfer rule 506a in FIG. 8, in the transfer unit 230. Moreover, the local control unit 210 of the CEP node 200 having the node ID "N31" sets the transfer rule 506c in FIG. 8 in the transfer unit 230.

In this process, the event processing node and the transfer path are determined as illustrated in FIG. 13, and thereby the processing rule 503, the transfer rule 506, and the local transfer rule 1506 are set in each of the CEP nodes 200.

Next, operation of event processing in this exemplary embodiment of the present invention will be described.

The transfer unit 230 of each of the CEP nodes 200 between the event source 300 and the event processing node on the transfer path transmits the event 501 according to the set transfer rule 506. In this way, the event 501 transmitted by the event source 300 is transferred to the event processing node.

For example, in FIG. 13, the event source 300 transmits the event 501 illustrated in FIG. 6, to the CEP node 200 having the node ID "N11". In the transfer unit 230 of the CEP node 200 having the node ID "N11", the transfer condition in the transfer rule 506a is satisfied in connection with the event 501 (transmission source ID=S11). Accordingly, the transfer unit 230 transfers the event 501 to the CEP node 200 having the node ID "N22", which is the transfer destination in the transfer rule 506a.

The transfer unit 230 of the event processing node transfers the event 501 to a corresponding one of the processing units 220 according to the set local transfer rule 1506. The processing unit 220 of the event processing node performs the event processing according to the set processing rule 503, generates the event processing result 507, and then transmits the event processing result 507 to the transfer unit 230.

For example, in the transfer unit 230 of the CEP node 200 having the node ID "N22", the transfer condition in the local transfer rule 1506 is satisfied in connection with the event 501 (transmission source ID=S11). Accordingly, the transfer unit 230 transfers the event 501 to the processing unit 220 having the processing unit ID "EP1", which is the transfer destination in the local transfer rule 1506. When the processing unit 220 having the processing unit ID "EP1" receives ten events 501 (transmission source ID=S11), the processing condition in the processing rule 503 (Condition 1) is satisfied. The processing unit 220 calculates the average value of Attribute A of the ten events 501 (transmission source ID=S11) according to the processing content in the processing rule 503. Then, the processing unit 220 generates the event processing result 507 in FIG. 9 including the calculated average value, and transmits the event processing result 507 to the transfer unit 230.

The transfer unit 230 of each of the event processing node and the CEP nodes 200 between the event processing node and the event sink 400 on the transfer path transfers the event processing result 507 according to the set transfer rule 506. In this way, the event processing result 507 generated by the event processing node is transferred to the event sink 400.

For example, in the transfer unit 230 of the CEP node 200 having the node ID "N22", the transfer condition in the transfer rule 506b is satisfied in connection with the event processing result 507 (processing rule ID=PR1). Accordingly, the transfer unit 230 transfers the event processing result 507 to the CEP node 200 having the node ID "N31", which is the transfer destination in the transfer rule 506b.

Similarly, in the transfer unit 230 of the CEP node 200 having the node ID "N31", the transfer condition in the transfer rule 506c is satisfied in connection with the event processing result 507 (processing rule ID=PR1). Accordingly, the transfer unit 230 transfers the event processing result 507 to the event sink 400 having the node ID "AP1", which is the transfer destination in the transfer rule 506c.

With the steps above, the operation in the first exemplary embodiment of the present invention is completed.

Next, other concrete examples will be described according to the first exemplary embodiment of the present invention.

Another Concrete Example 1

As another concrete example 1, description will be given of an example of the case in which event processing is performed on the events 501 transmitted by the multiple event sources 300.

Figure 14:
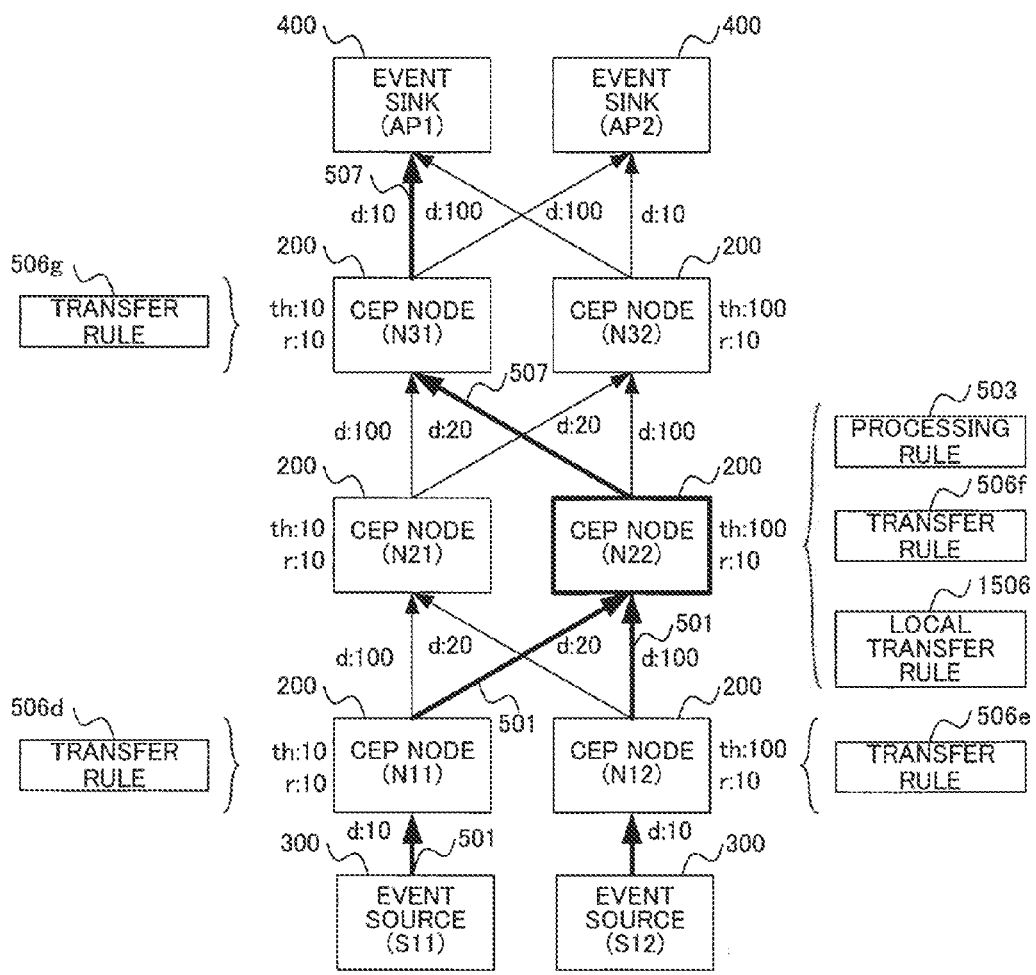
FIG. 14 is a diagram illustrating another example of the result of determination of an event processing node and a transfer path in the first exemplary embodiment of the present invention.

FIG. 14 is a diagram illustrating another example of a result of determination of an event processing node and a transfer path in the first exemplary embodiment of the present invention. FIG. 15 is a table illustrating another example of the event processing setting request 502 in the first exemplary embodiment of the present invention. FIG. 16 provides tables each illustrating another example of the transfer rule 506 in the first exemplary embodiment of the present invention.

In this example, it is assumed that the transfer delay, the throughput, and the response of each node are set as in FIG. 14. It is also assumed that the event processing control device 100 has received the event processing setting request 502 in FIG. 15 from the event sink 400 having the node ID "AP1."

In this example, in the processing rule 503 included in the event processing setting request 502 in FIG. 15, the processing condition "Condition 1: 10 Events (transmission source ID=S11 or S12)" and the processing content "average (Condition 1, A)" are set. In this case, the events 501 necessary for the event processing are transmitted by multiple different event sources 300.

In Step S103 above, the node and path determination unit 120 of the event processing control device 100 determines a combination of a transfer path and an event processing node which satisfies the required service level 505, by setting, as a candidate path, the path combining the paths from the multiple respective event sources 300 to the common CEP node 200 (each corresponding to an individual path or a first path) and the path from the common CEP node 200 to the event sink 400 (corresponding to a common path or a second path). In this step, the node and path determination unit 120 selects an event processing node from the CEP nodes 200 on the common path. In addition, the node and path determination unit 120 checks whether the greatest value of the total delay time of the paths from the respective event sources 300 to the event sink 400 is equal to or larger than the required response.

For example, in FIG. 14, when the CEP node 200 having the node ID "N22" is a candidate node in the candidate path combining the individual path including the node IDs "S11", "N11", and then "N22", the individual path including the node IDs "S12", "N12", and then "N22", and the common path including the node IDs "N22", "N31", and then "AP1", the throughput "100 events/second" of the candidate node is equal to or larger than the required throughput "50 events/ second". In addition, the greatest value of the total delay time is "150 milliseconds" in the paths including the node IDs "S12", "N12", "N22", "N31", and then "AP1", which is equal to or smaller than the required response "200 milliseconds". Accordingly, the node and path determination unit 120 determines the combination of the path including the node IDs "S11", "N11", and then "N22", "S12", "N12", and then "N22", and "N22", "N31", and then "AP1", and the CEP node 200 having the node ID "N22", to be the combination of a transport path and an event processing node.

Then, in Step S104, the node and path determination unit 120 transmits the processing rule 503 in FIG. 15 to the CEP node 200 having the node ID "N22".

In Step S105, the node and path determination unit 120 transmits the transfer rules 506d, e, f, and g in FIG. 16 to the respective CEP nodes 200 having the node IDs "N11", "N12", "N22", and "N31".

Further, in Step S113, the local control unit 210 of the CEP node 200 having the node ID "N22" sets, in the transfer unit 230, the local transfer rule 1506 having the transfer condition "Event (transmission source ID=S11 or S12)" in FIG. 12.

With the above steps, the event processing node and the transfer path are determined as illustrated in FIG. 14, and thereby the processing rule 503, the transfer rules 506, and the local transfer rule 1506 are set in each of the CEP nodes 200.

Then, the event 501 (transmission source ID=S11 or S12) transmitted by each of the event sources 300 having the node IDs "S11" and "S12" is transferred to the CEP node 200 having the node ID "N22". When the processing unit 220 of the CEP node 200 having the node ID "N22" receives ten events 501 (transmission source ID =S11 or S12), the processing condition (Condition 1) in the processing rule 503 in FIG. 15 is satisfied. The processing unit 220 calculates the average value of Attribute A of the ten events 501 (transmission source ID=S11 or S12) according to the processing content in the processing rule 503. Then, the event processing result 507 (rule ID=PR1) including the calculated average value is transferred to the event sink 400 having the node ID "AP1".

In the case where the event processing is performed on the events 501 transmitted by the multiple event sources 300, the node and path determination unit 120 may determine a combination of a candidate path and a candidate node close to each of the event source 300, as a combination of a transfer path and an event processing node, when there are multiple combinations of a candidate path and a candidate node which satisfy the required service level 505.

Another Concrete Example 2

As another concrete example 2, description will be given of a case where event processing is performed on the events 501 transmitted by the multiple event sources 300, and the processing rule 503 is divided and the divided processing rules are set.

Figure 17:
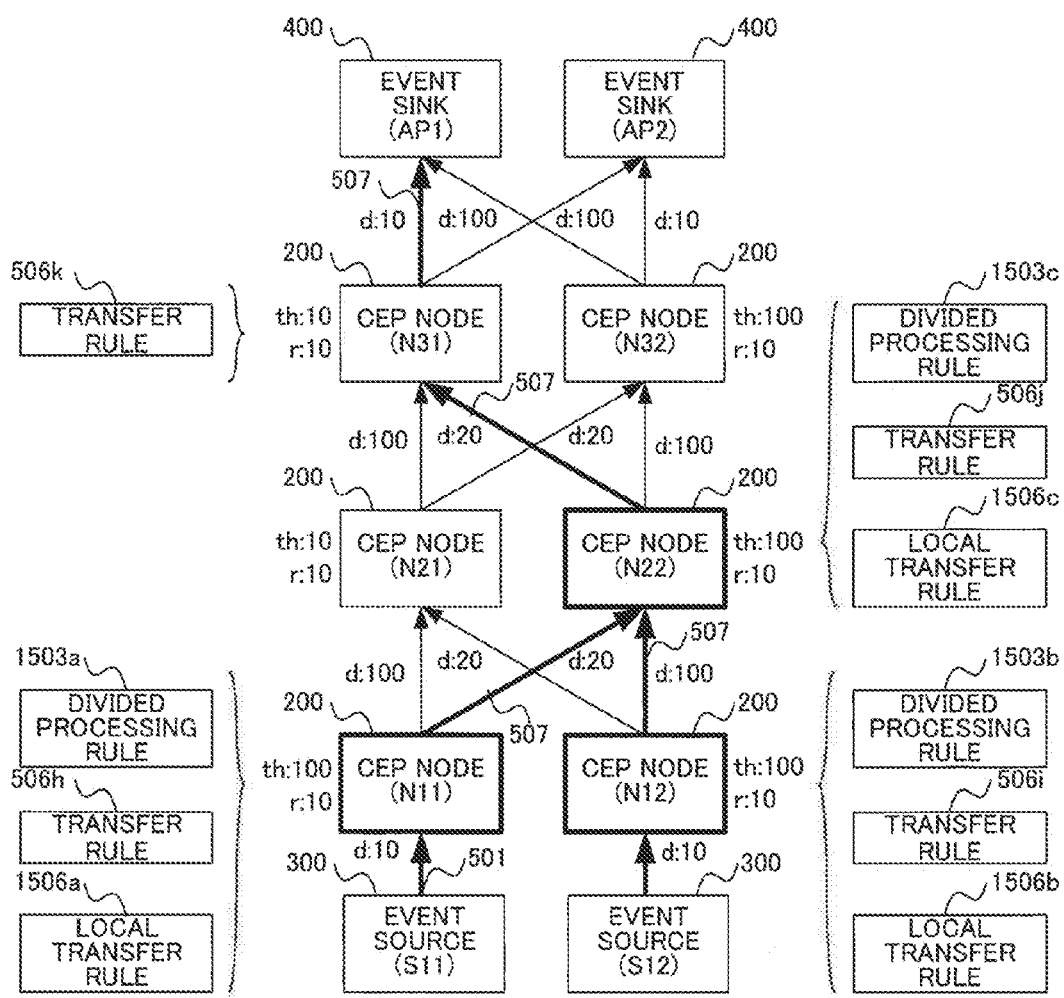
FIG. 17 is a diagram illustrating another example of the result of determination of an event processing node and a transfer path in the first exemplary embodiment of the present invention.

FIG. 17 is a diagram illustrating another example of a result of determination of an event processing node and a transfer path in the first exemplary embodiment of the present invention. FIG. 18 provides tables each illustrating another example of the event processing setting request 502 in the first exemplary embodiment of the present invention. FIG. 19 provides tables each illustrating another example of the transfer rule 506. FIG. 20 provides tables each illustrating another example of the local transfer rule 1506 in the first exemplary embodiment of the present invention.

In this example, it is assumed that the transfer delay, the throughput, and the response of each node are set as in FIG. 17. It is also assumed that the event processing control device 100 has received the event processing setting request 502 in FIG. 18 from the event sink 400 having the node ID "AP1"1.

In this example, in the processing rule 503 included in the event processing setting request 502 in FIG. 18, the processing condition "Condition 1: 10 Events (transmission source ID=S11) and Condition 2: 10 Events (transmission source ID=S12)" and the processing content "average (Condition 1, A)+average (Condition 2, A)" are set. In this case, the events 501 necessary for the event processing are transmitted by the multiple different event sources 300 as in Another Concrete Example 1. However, unlike Another Concrete Example 1, the processing rule 503 can be divided into processing rules (each corresponding to an individual processing rule or a first processing rule) for the respective events 501 from the respective different event sources 300, and a processing rule (an entire processing rule or a second processing rule) for the event processing result 507 of the individual processing rules.

For example, in Step S102 above, the node and path determination unit 120 of the event processing control device 100 divides the processing rule 503 into divided processing rules 1503a, b, and c as in FIG. 18. The divided processing rules 1503a and b are individual processing rules for the events 501 transmitted by the respective event sources 300 having the node IDs "IS11" and "IS12". The divided processing rule 1503c is an entire processing rule for the event processing result 507 for the divided processing rules 1503a and b. In the example in FIG. 18, the processing condition "Condition 1: 10 Events (transmission source ID=S11)" and the processing content "average (Condition 1, A)" are set in the divided processing rule 1503a, and the processing condition "Condition 1: 10 Events (transmission source ID =S12)" and the processing content "average (Condition 1, A)" are set in the divided processing rule 1503b. In addition, the processing condition "Condition 1: Result (RID=PR101) and Condition 2: Result (RID=PR102)" and the processing content "value (Condition 1)+value (Condition 2)" are set in the divided processing rule 1503c. In the above processing condition, "Result ( )" indicates that the event processing result 507 satisfying the condition in the parentheses is received. The processing content "value (Condition 1)" indicates a value of the processing result in the event processing result 507 satisfying the condition 1.

In Step S103 above, the node and path determination unit 120, as in Another Concrete Example 1, determines a combination of a transfer path and an event processing node which satisfies the required service level 505, by setting the path combining individual paths and a common path as a candidate path. Here, the node and path determination unit 120 extracts a candidate node in which each individual processing rule is to be set, from the CEP nodes 200 on each individual path. The node and path determination unit 120 also extracts a candidate node in which the entire processing rule is to be set, from the CEP nodes 200 on the common path. Then, the node and path determination unit 120 checks, for each of the candidate nodes in which the individual processing rules and the entire processing rule are to be set, whether the throughput of the candidate node is equal to or higher than the required throughput. In addition, the node and path determination unit 120 checks whether or not the greatest value of the total delay time including the responses of the candidate nodes on the paths from the respective event sources 300 to the event sink 400 included in the candidate path is equal to or smaller than the required response.

For example, in FIG. 17, when the CEP nodes 200 having the node IDs "N11", "N12", and "N22" are extracted as candidate nodes in which the divided processing rules 1503a, b and c are to be set, respectively, on the candidate path combining the individual path including the node IDs "S11, "N11", and then "N22", the individual path including the node IDs "S12", "N12", and then "N22", and the common path including the node IDs "N22", "N31", and then "AP1", the throughput of each of the candidate node "100 events/ second" is equal to or greater than the required throughput "50 events/second". Moreover, the greatest value of the total delay time is "160 milliseconds" of the path including the node IDs "S12", "N12", "N22", "N31", and then "AP1", which is equal to or smaller than the required response "200 milliseconds". Accordingly, the node and path determination unit 120 determines the combination of the path including the node IDs "S11", "N11", and then "N22", "S12", "N12", and then "N22", and "N22", "N31", and then "AP1", and the CEP nodes 200 having the node IDs "N11", "N12", and "N22", as the combination of paths and event processing nodes.

Then, in Step S104, the node and path determination units 120 transmits the divided processing rules 1503a, b, and c in FIG. 18 to the respective CEP nodes 200 having the node IDs "N11", "N12", and "N22".

In Step S105, the node and path determination unit 120 transmits transfer rules 506h, i, j, and k in FIG. 19 to the respective CEP nodes 200 having the node IDs "N11", "N12", "N22", and "N31". Here, a condition in the event processing result 507 such as "Result (RID=PR101)" or "Result (RID=PR102)" is set as the transfer condition in each of the transfer rules 506h and i set in the CEP nodes 200 having the node IDs "N11" and "N12".

Further, in Step S113, the local control unit 210 of each of the CEP nodes 200 having the node IDs "N11", "N12", and "N22" sets a corresponding one of local transfer rules 1506a, b, and c in FIG. 20, in the transfer unit 230. Here, a condition in the event processing result 507 such as "Result (RID=PR101)" or "Result (RID=PR102)" is set as the transfer condition in the local transfer rule 1506c set in the CEP node 200 having the node ID "N22".

With the above steps, the event processing node and the transfer path are determined as illustrated in FIG. 17, and thereby the processing rule 1503, the transfer rule 506, and the local transfer rule 1506 are set in each of the CEP nodes 200.

Then, the event 501 transmitted by the event source 300 having the node ID "S11" (transmission source ID=S11) is transferred to the CEP node 200 having the node ID "N11". When the processing unit 220 of the CEP node 200 having the node ID "N11" receives ten events 501 (transmission source ID=S11), the processing condition (Condition 1) in the divided processing rule 1503a in FIG. 18 is satisfied. The processing unit 220 calculates the average value of Attribute A of the ten events 501 (transmission source ID=S11) according to the processing content in the divided processing rule 1503a, and generates the event processing result 507 (rule ID=PR101) including the calculated average value. Then, the event processing result 507 (rule ID=PR101) is transferred to the CEP node 200 having the node ID "N22".

Similarly, the event 501 (transmission source ID=S12) transmitted by the event source 300 having the node ID "S12" is transferred to the CEP node 200 having the node ID "N12". When the ten events 501 (transmission source ID=S12) are received in the processing unit 220 of the CEP node 200 having the node ID "N12 ", the processing condition (Condition 1) in the divided processing rule 1503b in FIG. 18 is satisfied. The processing unit 220 calculates the average value of Attribute A of the ten events 501 (transmission source ID=S12) according to the processing content in the divided processing rule 1503b, and generates the event processing result 507 (rule ID=PR102) including the calculated average value. Then, the event processing result 507 (rule ID=PR102) is transferred to the CEP node 200 having the node ID "N22".

When the event processing result 507 (rule ID=PR101) and the event processing result 507 (rule ID=PR102) are received in the processing unit 220 of the CEP node 200 having the node ID "N22", the processing condition (Condition 1 and Condition 2) in the divided processing rule 1503c in FIG. 18 is satisfied. The processing unit 220 calculates the total of the average values included in the event processing result 507 (rule ID=PR101) and the event processing result 507 (rule ID =PR102), according to the processing content in the divided processing rule 1503c. Then, the event processing result 507 (rule ID=PR103) including the calculated total value is transferred to the event sink 400 having the node ID "AP1".

Another Concrete Example 3

As Another Concrete Example 3, description will be given of another example of the case where the processing rule 503 is divided and the divided rules are set.

Figure 21:
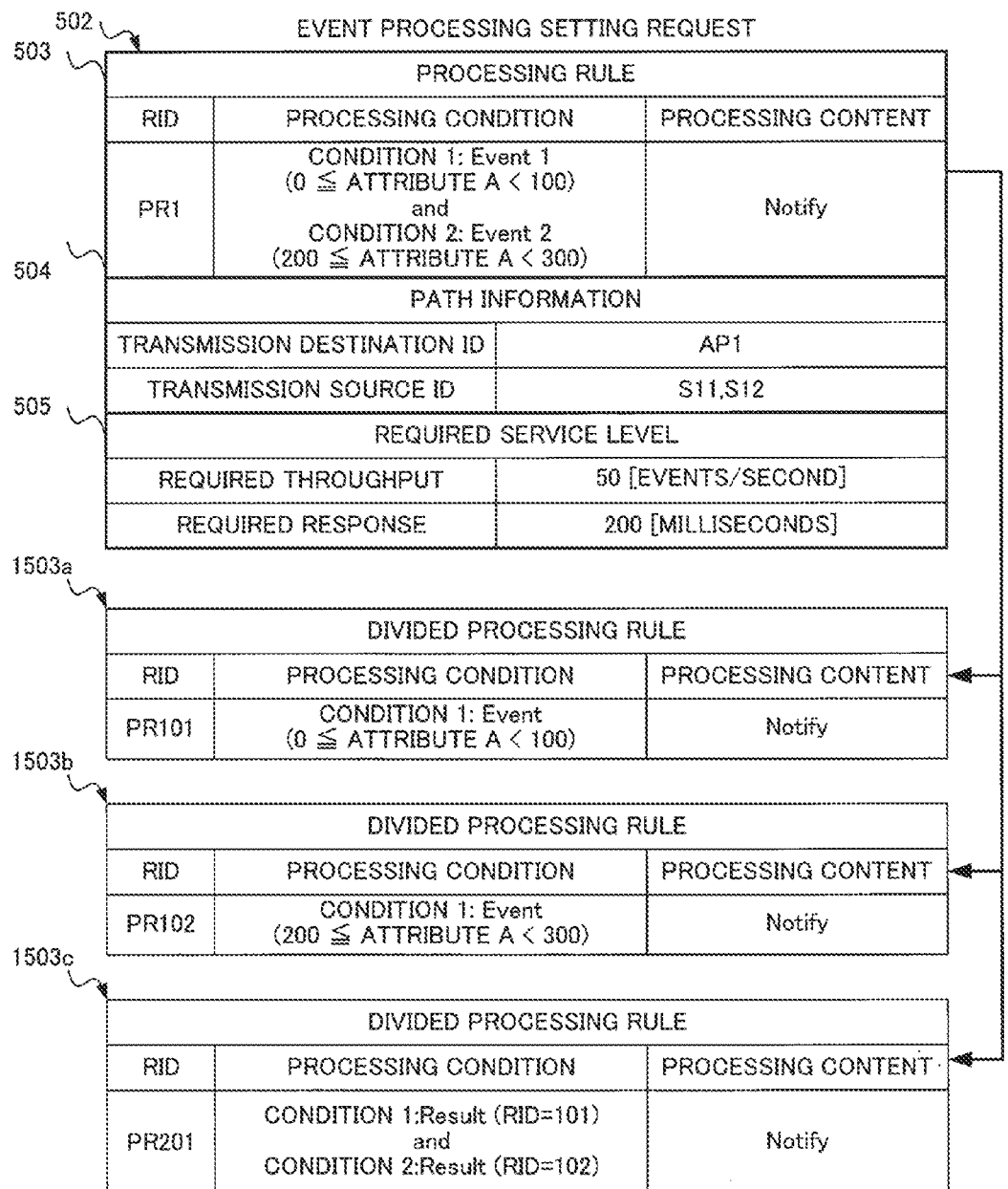
FIG. 21 is a diagram illustrating another example of the event processing setting request 502 in the first exemplary embodiment of the present invention.

FIG. 21 provides tables each illustrating another example of the event processing setting request 502 in the first exemplary embodiment of the present invention. FIG. 22 provides tables each illustrating another example of the local transfer rules 1506 in the first exemplary embodiment of the present invention.

In this example, it is assumed, as in Another Concrete Example 2, the transfer delay, the throughput, and the response of each node are set as in FIG. 17. It is also assumed that the event processing control device 100 has received the event processing setting request 502 in FIG. 21 from the event sink 400 having the node ID "AP1".

In this example, in the processing rule 503 included in the event processing setting request 502 in FIG. 21, the processing condition "Condition 1: Event (0≤Attribute A<100) and Condition 2: Event (200≤Attribute A<300)" and the processing content "Notify" are set. "Event ( )" in the processing condition indicates that the event 501 satisfying the condition described in the parentheses is received. "Notify" in the processing content indicates that notification that the processing condition is satisfied.

It is assumed that the range of Attribute A of the events 501 received from the event source 300 is predetermined to be 0≤Attribute A<200 for the CEP node 200 having the node ID "N11" and 200≤Attribute A<400 for the CEP node 200 having the node ID "N12". This corresponds, for example, to a case where the CEP nodes 200 are set in respective areas, and the event source 300 in each of the areas detects predetermined mobile units (such as humans, cars, and busses) and then transmits, to the CEP node 200 of the area, the events 501 having the positions of the respective mobile units as Attribute A. In this case, as in Another Concrete Example 2, the events 501 necessary for the event processing are transmitted by the multiple different event sources 300. In addition, as in Another Concrete Example 2, the processing rule 503 can be divided into individual processing rules for the respective events 501 transmitted by the different event sources 300 and an entire processing rule for the event processing results 507 of the individual processing rules.

For example, in Step S102 above, the node and path determination unit 120 of the event processing control device 100 divides the processing rule 503 into divided processing rules 1503a, b, and c as in FIG. 21. In the example in FIG. 21, the processing condition "Condition 1: Event (0≤Attribute A<100)" and the processing content "Notify" are set in the divided processing rule 1503a, and the processing condition "Condition 1: Event (200≤Attribute A<300)" and the processing content "Notify" are set in the divided processing rule 1503b. In addition, the processing condition "Condition 1: Result (RID=PR101) and Condition 2: Result (RID=PR102)" and the processing content "Notify" are set in the divided processing rule 1503c.

In Step S103 above, as in Another Concrete Example 2, the node and path determination unit 120 determines the combination of the paths including the node IDs "S11", "N11", and then "N22", "S12", "N12", and then "N22", and "N22", "N31", and then "AP1", and the CEP nodes 200 having the node IDs "N11", "N12", and "N22", as the combination of a transfer path and event processing nodes.

Then, in Step S104, the node and path determination unit 120 transmits the divided processing rules 1503a, b, and c to the respective CEP nodes 200 having the node IDs "N11", "N12", and "N22".

In Step S105, the node and path determination unit 120 transmits the transfer rules 506h, i, j, and k in FIG. 19 to the respective CEP nodes 200 having the node IDs "N11", "N12", "N22", and "N31".

Moreover, in Step S113, the local control unit 210 of each of the CEP nodes 200 having the node IDs "N11", "N12", and "N22" sets a corresponding one of the local transfer rules 1506a, b, and c, in FIG. 22 in the transfer unit 230.

With the above steps, as in Another Concrete Example 2, the event processing nodes and the transfer path are determined as illustrated in FIG. 17, and thereby the divided processing rules 1503, the transfer rules 506, and the local transfer rules 1506 are set in each of the CEP nodes 200.

Then, the event 501 (Attribute A=50) transmitted by the event source 300 having the node ID "S11" is transferred to the CEP node 200 having the node ID "N11". When the event 501 (Attribute A=50) is received in the processing unit 220 of the CEP node 200 having the node ID "N11", the processing condition (Condition 1) in the divided processing rule 1503a in FIG. 21 is satisfied. The processing unit 220 generates the event processing result 507 (rule ID=PR101) indicating that the processing condition having the rule ID "PR101" is satisfied, according to the processing content in the divided processing rule 1503a. The event processing result 507 (rule ID=PR101) is transferred to the CEP node 200 having the node ID "N22".

Similarly, the event 501 (Attribute A=250) transmitted by the event source 300 having the node ID "S12" is transferred to the CEP node 200 having the node ID "N12". When the event 501 (Attribute A=250) is received in the processing unit 220 of the CEP node 200 having the node ID "N12", the processing condition (Condition 1) in the divided processing rule 1503b in FIG. 21 is satisfied. The processing unit 220 generates the event processing result 507 (rule ID=PR102) indicating that the processing condition having the rule ID "PR102" is satisfied, according to the processing content in the divided processing rule 1503b. The event processing result 507 (rule ID=PR102) is transferred to the CEP node 200 having the node ID "N22".

When the event processing result 507 (rule ID=PR101) and the event processing result 507 (rule ID=PR102) are received in the processing unit 220 of the CEP node 200 having the node ID "N22", the processing condition (Condition 1 and Condition 2) in the divided processing rule 1503c in FIG. 21 is satisfied. The processing unit 220 generates the event processing result 507 (rule ID=PR103) indicating that the processing condition having the rule ID "PR103" is satisfied, according to the processing content in the divided processing rule 1503c. Then, the event processing result 507 (rule ID=PR103) is transferred to the event sink 400 having the node ID "AP1".

In the first exemplary embodiment of the present invention, description has been given of the configuration and the operations by taking, as an example, the case where the required throughput and the required response are specified by the required service level 505. However, one of the required throughput and the required response may be specified by the required service level 505. In this case, the node and path determination unit 120 determines the combination of event processing nodes and a transfer path so that the required throughput or the required response specified by the required service level 505 would be satisfied. Alternatively, other requirements related to the event processing may be specified by the required service level 505.

Next, a characteristic configuration of the first exemplary embodiment of the present invention will be described.

Figure 1:
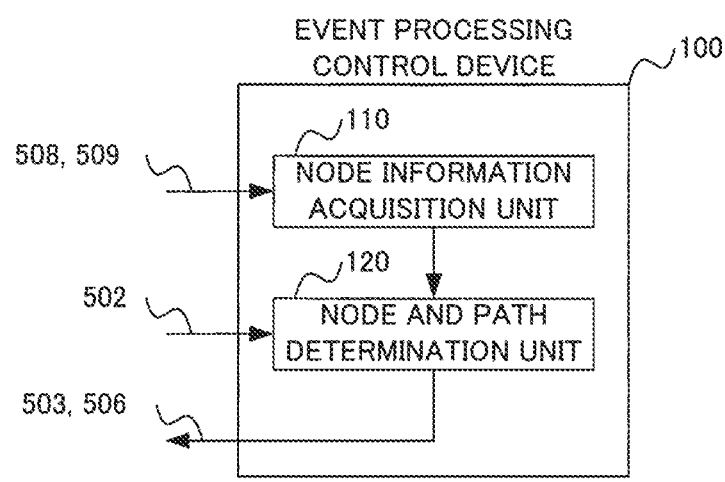
FIG. 1 is a block diagram illustrating a characteristic configuration of a first exemplary embodiment of the present invention.

FIG. 1 is a block diagram illustrating a characteristic configuration of the first exemplary embodiment of the present invention. With reference to FIG. 1, the event processing control device 100 in the first exemplary embodiment of the present invention includes the node information acquisition unit 110 and the node and path determination unit 120.

The node information acquisition unit 110 acquires pieces of node information 508, 509 which include information related to a connection destination node and performance information, from each of a plurality of nodes. Each of the plurality of nodes transfers an event 501 or an event processing result 507 to another connected node according to a transfer path. The plurality of nodes includes one or more nodes each being able to perform event processing in which a received event 501 is processed and an event processing result 507 is generated.

The node and path determination unit 120 determines a combination of an event processing node which is a node to perform the event processing and the transfer path from a source node from which an event 501 is transmitted to a destination node to which an event processing result 507 is transmitted, through one or more nodes including the event processing node, in such a way to satisfy a specified service level 505, on the basis of the pieces of node information 508, 509.

According to the first exemplary embodiment of the present invention, the service level required for the event processing can be satisfied in the event processing system. This is because the node and path determination unit 120 determines a combination of a transfer path and an event processing node on the transfer path so that the required service level 505 would be satisfied, on the basis of the pieces of node information 508 and node information 509.

Moreover, with this configuration, when the CEP nodes 200 having various levels of performance are usable as event processing nodes, appropriate one of the CEP nodes 200 can be used as an event processing node.

Moreover, according to the first exemplary embodiment of the present invention, the required service level can be satisfied even when the event processing is performed on the events 501 transmitted by the multiple event sources 300. This is because the node and path determination unit 120 determines, as a combination of a transfer path and an event processing node, a combination which satisfies the required service level 505 among those of a path combining individual paths from the respective event sources 300 to the common node and a common path from the common node to the event sink 400, and nodes capable of performing the event processing on the common path.

Moreover, according to the first exemplary embodiment of the present invention, the load of the transfer path and the load of each event processing node can be reduced when the processing rule 503 can be divided into individual rules for the respective events 501 from the multiple event sources 300 and the entire rule for the processing results of the individual rules. This is because the node and path determination unit 120 determines, as a combination of a transfer path and event processing nodes in which the multiple respective individual rules are set and in which the entire rule is set, a combination which satisfies the required service level 505 among those of a path combining multiple individual paths and a common path, and nodes each capable of performing the event processing in the multiple respective paths or capable of performing the event processing on the common path.

(Second Exemplary Embodiment)

Next, a second exemplary embodiment of the present invention will be described.

The second exemplary embodiment of the present invention is different from the first exemplary embodiment of the present invention in that CEP nodes 200 are movable and the connection relationship between the CEP nodes 200 is changeable.

First, description will be given of a configuration of the second exemplary embodiment of the present invention.

Figure 23:
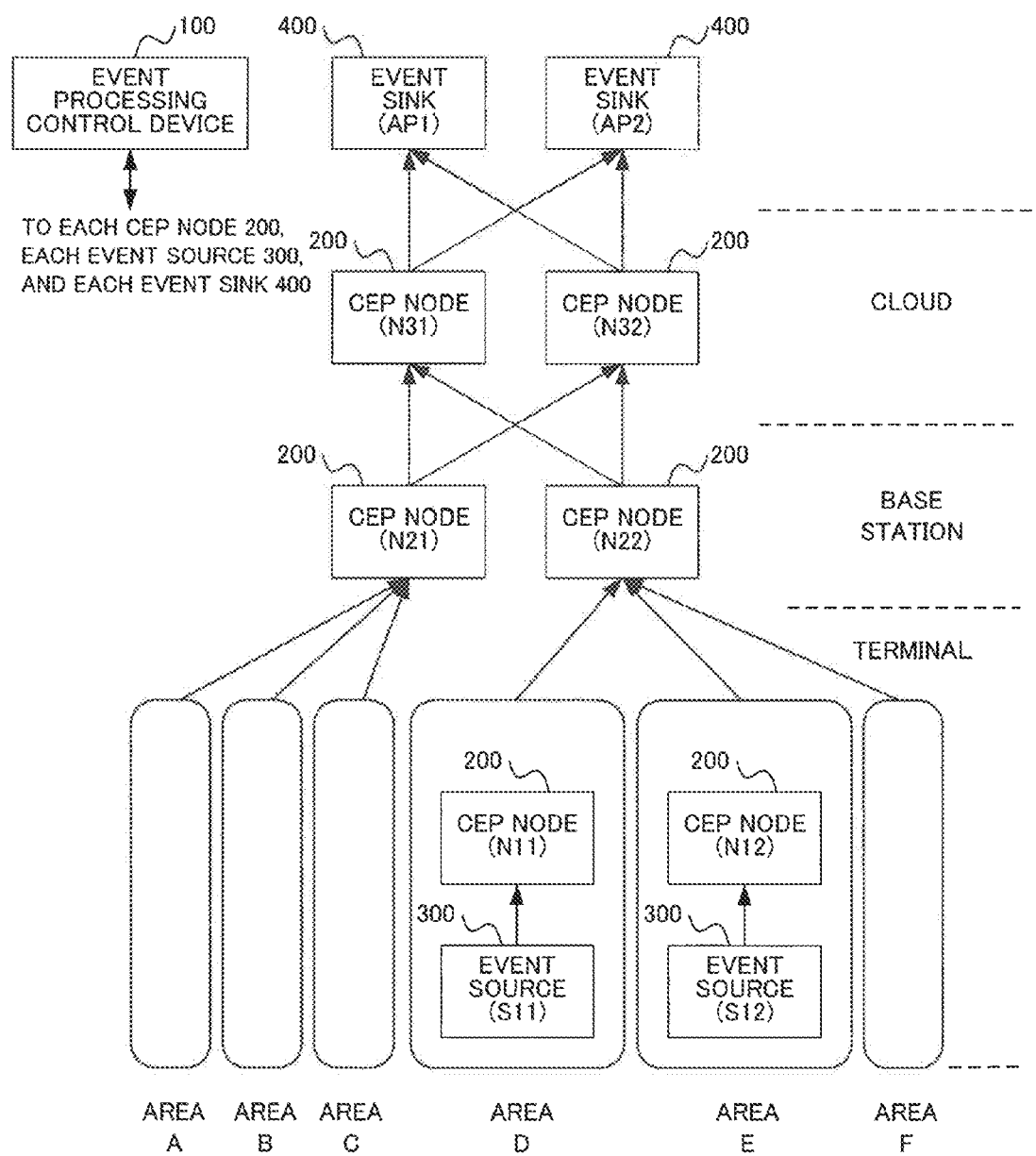
FIG. 23 is a block diagram illustrating a configuration of an event processing system in a second exemplary embodiment of the present invention.

FIG. 23 is a block diagram illustrating a configuration of an event processing system in the second exemplary embodiment of the present invention. With reference to FIG. 23, the CEP nodes 200 are positioned in multiple levels of hierarchy ("cloud", "base station", and "terminal").

Here, each CEP node 200 in the "terminal" level (first node) and an event source 300 connected to the CEP node 200 (transmitting an event 501 to the CEP node 200) are included in the same movable device such as a mobile terminal, and can move to any of multiple areas, for example. Each CEP node 200 in the "base station" level (second node) has multiple cover areas, and is connected to the CEP nodes 200 in the "terminal" level each moving (existing) in any of the cover areas.

In the example in FIG. 23, the cover areas of the CEP node 200 having the node ID "N21" are areas having the area identifications (area IDs) "A", "B", and "C". Meanwhile, the cover areas of the CEP node 200 having the node ID "N22" are areas having the area IDs "D", "E", and "F".

Each CEP node 200 in the "base station" level is connected to the CEP nodes 200 in the "cloud" level. Moreover, each CEP node in the "cloud" level is connected to event sinks 400.

FIG. 24 provides tables each illustrating an example of node information 508 in the second exemplary embodiment of the present invention. Each piece of node information 508 in the second exemplary embodiment of the present invention includes placement information in addition to the content of the piece of node information 508 (FIG. 10) in the first exemplary embodiment of the present invention. The placement information includes hierarchical level type indicating the level to which the corresponding CEP belongs.

When the hierarchical level type is "terminal", the area information further includes information on moving area. As the moving area, the area ID of the area in which the CEP node 200 is moving (exists) is set. In addition, transfer delay to the corresponding CEP node 200 in the "base station" level is set as the transfer performance.

When the hierarchical level type is "base station", the area information further includes information on cover area. As the cover area, the area ID of each cover area of the CEP node 200 is set.

Next, description will be given of operation of the event processing system in the second exemplary embodiment of the present invention. In the following, the respects of a rule setting process in the second exemplary embodiment of the present invention which are different from those of the first exemplary embodiment of the present invention will be described.

Figure 25:
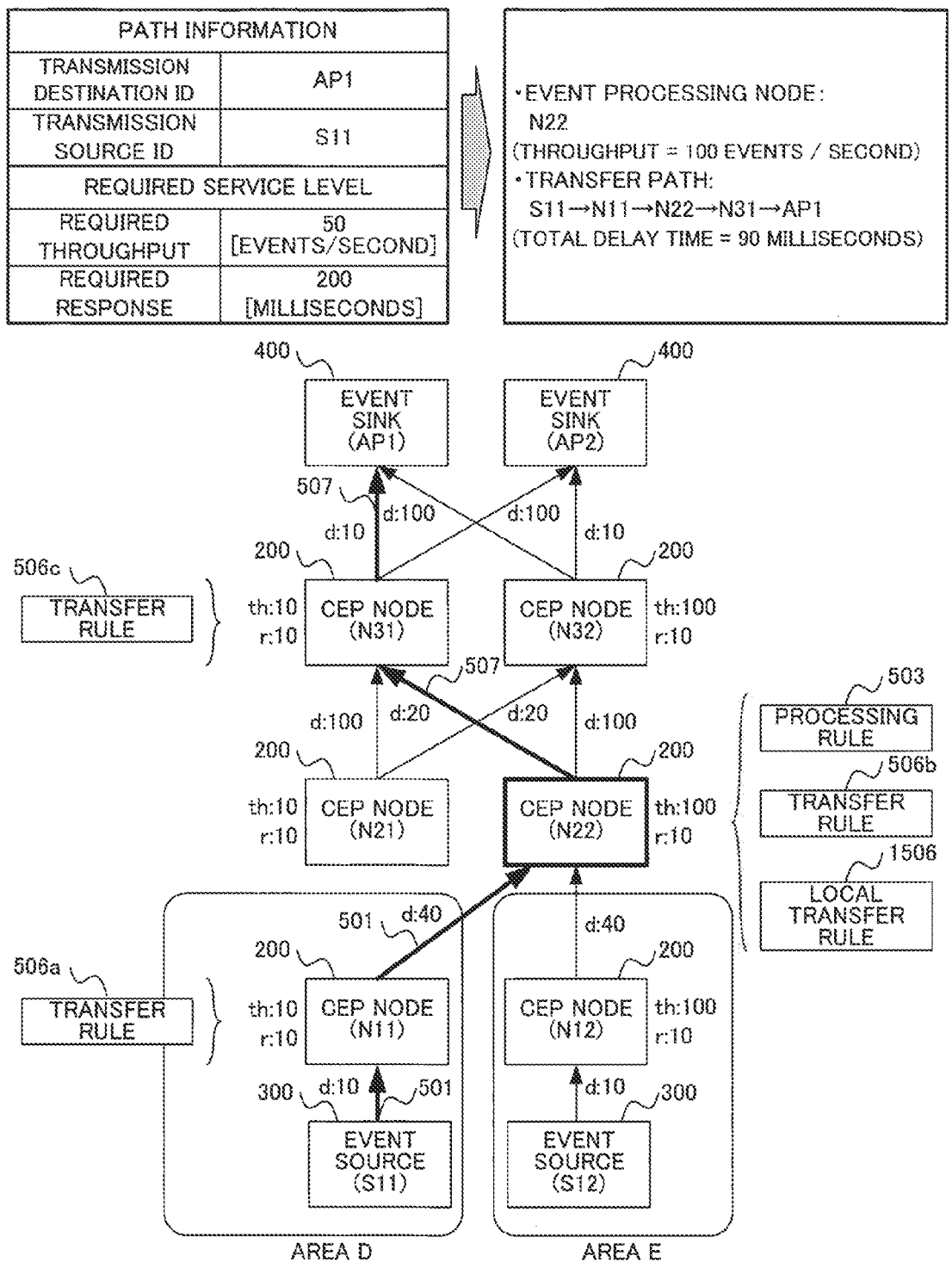
FIG. 25 is a diagram illustrating an example of a result of determination of an event processing node and a transfer path in the second exemplary embodiment of the present invention.

FIG. 25 is a diagram illustrating an example of a result of determination of an event processing node and a transfer path in the second exemplary embodiment of the present invention.

Here, it is assumed, as illustrated in FIG. 23, that the CEP node 200 having the node ID "N11" exists in the area having the area ID "D". In this case, in Step S101, a node information acquisition unit 110 acquires pieces of node information 508$a$ to $f$ illustrated in FIG. 24 from the respective CEP nodes 200 having the node IDs "N11", "N12", "N21", "N22", "N31", and "N32". Further, as in the first exemplary embodiment of the present invention, it is assumed that a node and path determination unit 120 has received an event processing setting request 502 illustrated in FIG. 7 from the event sink 400 having the node ID "AP1" in Step S102.

In Step S103, with reference to the pieces of node information 508, the node and path determination unit 120 determines that the CEP node 200 in the "terminal" level is connected to the CEP node 200 being in the "base station" level and having, as a cover area, the area in which the CEP node 200 in the "terminal" level exists, and determines an event processing node and a transfer path accordingly.

For example, in FIG. 25, when the CEP node 200 having the node ID "N22" is a candidate node in the candidate path including the node IDs "S11", "N11", "N22", "N31", and then "AP1", the throughput of the candidate node "100 events/second" is equal to or greater than the required throughput "50 events/second", and the total delay time "90 milliseconds" is equal to or smaller than the required response "200 milliseconds". Accordingly, the node and path determination unit 120 determines, as a combination of a transfer path and an event processing node, the combination of the path including the node IDs "S11", "N11", "N22", "N31", and then "AP1" and the CEP node 200 having the node ID "N22".

The event processing in the second exemplary embodiment of the present invention is the same as that in the first exemplary embodiment of the present invention.

With the above steps, the operation in the second exemplary embodiment of the present invention is completed.

According to the second exemplary embodiment of the present invention, the service level required for the event processing can be satisfied even when the connection relationship between the CEP nodes 200 is changeable as in the case of the CEP nodes 200 in the "base station" level and the moveable CEP nodes 200 in the "terminal" level. This is because the node and path determination unit 120 determines, for the corresponding CEP node 200 in the "terminal" level, whether the CEP node 200 and any of the CEP nodes 200 in the "base station" level are connected, on the basis of the predetermined cover areas of the CEP nodes 200 in the "base station" level and the information on the area in which the CEP node 200 exists.

(Third Exemplary Embodiment)

Next, a third exemplary embodiment of the present invention will be described.

The third exemplary embodiment of the present invention is different from the first exemplary embodiment of the present invention in that the service level is monitored.

First, a configuration of the third exemplary embodiment of the present invention will be described.

Figure 26:
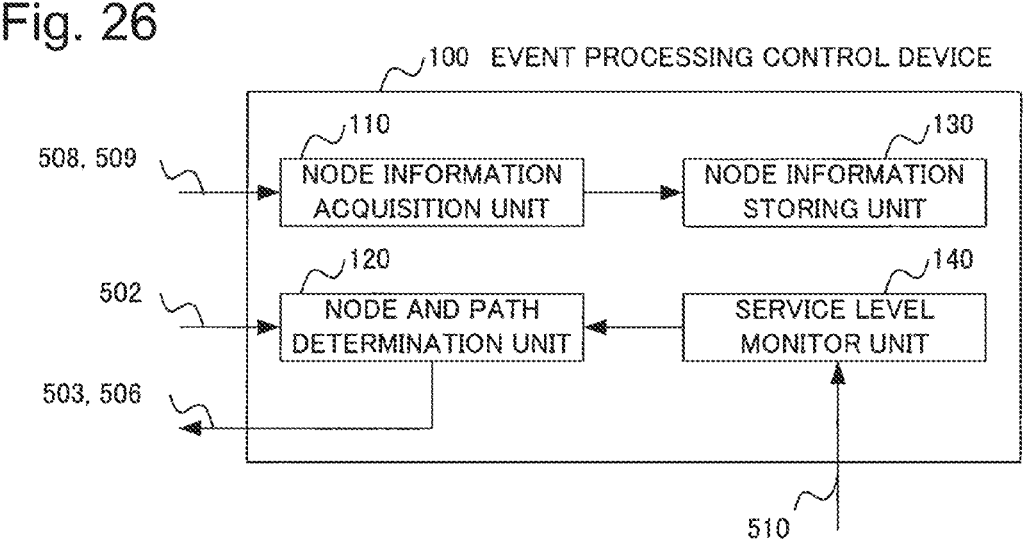
FIG. 26 is a block diagram illustrating a configuration of an event processing control device 100 in a third exemplary embodiment of the present invention.

FIG. 26 is a block diagram illustrating a configuration of an event processing control device 100 in the third exemplary embodiment of the present invention. With reference to FIG. 26, the event processing control device 100 in the third exemplary embodiment of the present invention includes a service level monitor unit 140 in addition to the configuration of the event processing control device 100 in the first exemplary embodiment of the present invention.

The service level monitor unit 140 receives a monitor result 510 from each of an event processing node and an event sink 400.

Figure 27:
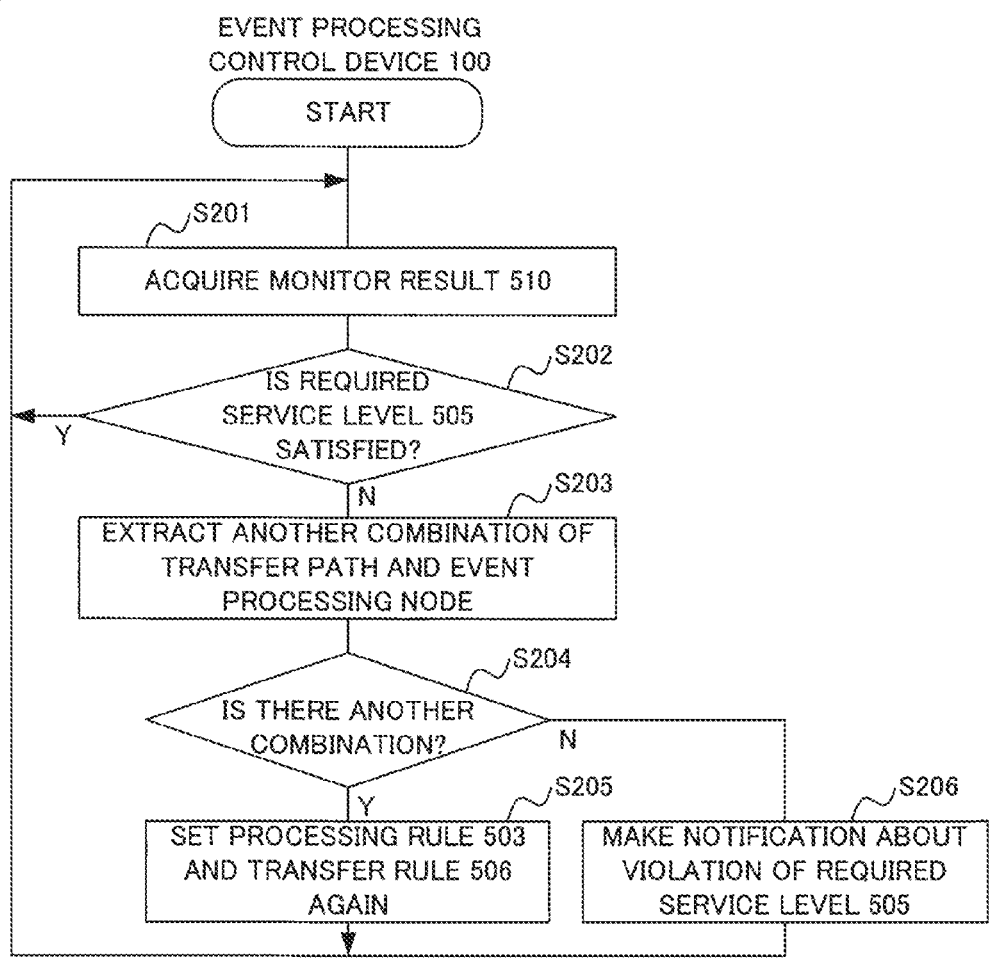
FIG. 27 is a flowchart illustrating a rule setting process in the third exemplary embodiment of the present invention.

Next, operation of an event processing system in the third exemplary embodiment of the present invention will be described with a concrete example. A rule setting process and event processing are the same as those in the first exemplary embodiment of the present invention. In the following, description will be given of a service level monitor process in the third exemplary embodiment of the present invention. FIG. 27 is a flowchart illustrating a rule setting process in the third exemplary embodiment of the present invention.

Figure 28:
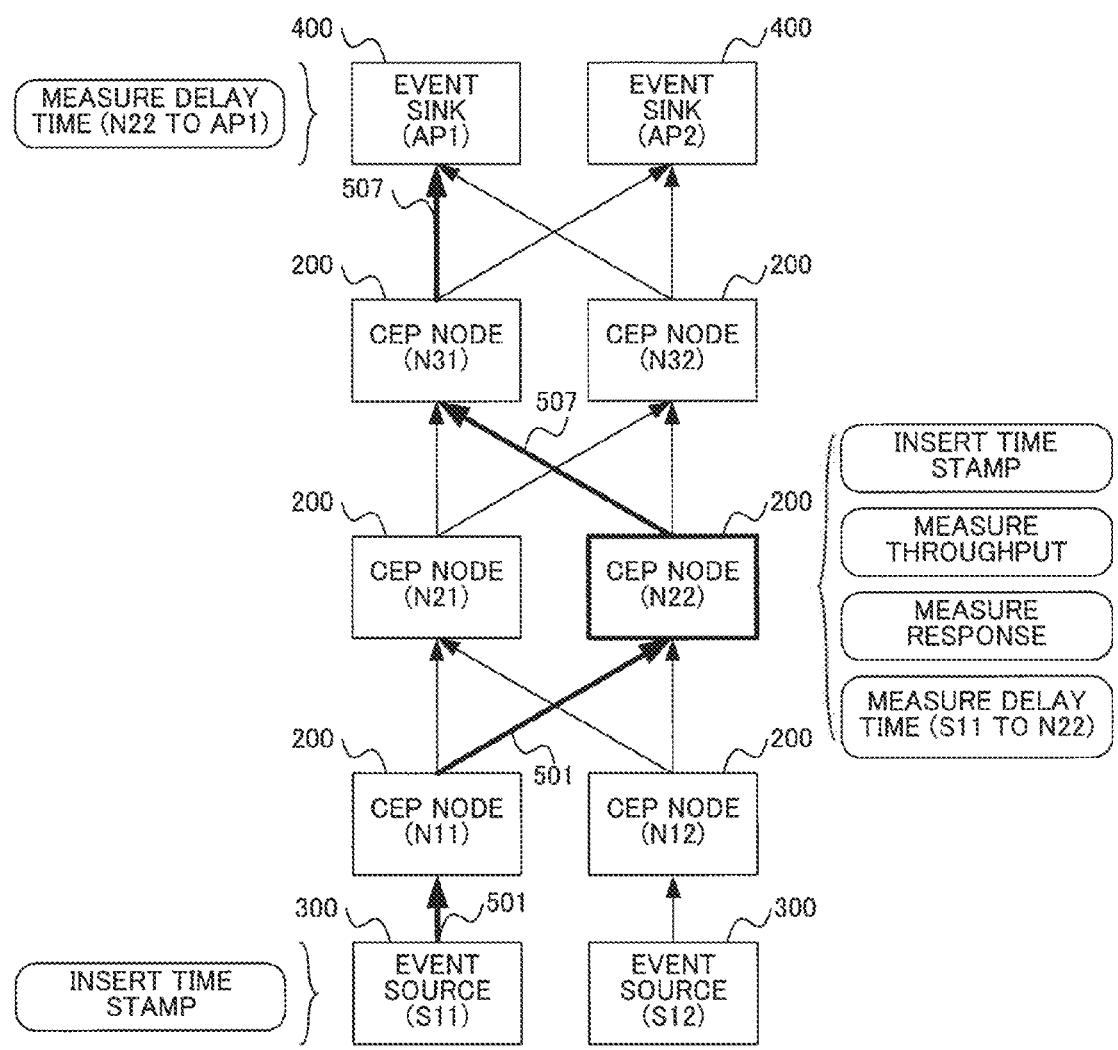
FIG. 28 is a diagram illustrating an example of a result of determination of an event processing node and a transfer path in the third exemplary embodiment of the present invention.

FIG. 28 is a diagram illustrating an example of a result of determination of an event processing node and a transfer path in the third exemplary embodiment of the present invention.

In this example, it is assumed that the combination of the path including the node IDs "S11", "N11", "N22", "N31", and then "AP1" and the CEP node 200 having the node ID "N22" is determined as a combination of a transfer path and an event processing node in the rule setting process.

First, the service level monitor unit 140 of the event processing control device 100 acquires the monitor result 510 from each of the event processing node and the event sink 400 on the transfer path (Step S201).

Here, the monitor result 510 from the event processing node includes the result of measurement of delay time of the path from the event source 300 to the event processing node on the transfer path, the response time and the throughput of a processing unit 220 of the event processing node. Meanwhile, the monitor result 510 from the event sink 400 includes the result of measurement of delay time of the path from the event processing node to the event sink 400 on the transfer path.

The delay time of the path from the event source 300 to the event processing node is measured by the transfer unit 230 of the event processing node on the basis of a time stamp inserted to an event 501 in the event source 300, for example. Meanwhile, the delay time of the path from the event processing node to the event sink 400 is measured by the event sink 400 on the basis of a time stamp inserted to an event processing result 507 in the event processing node, for example. The response time and the throughput of the processing unit 220 of the event processing node are measured by the transfer unit 230 of the event processing node.

In case that a processing rule 503 is divided into multiple divided processing rules 1503 and the divided processing rules 1503 are set in respective event processing nodes, delay time is measured for each of the paths divided for the event processing nodes.

The service level monitor unit 140 checks whether the combination of the transfer path and the event processing node satisfy a required service level 505, on the basis of the acquired monitor results 510 (Step S202). In this step, the service level monitor unit 140 calculates the measured value of total delay time by adding up the acquired delay time of the path from the event source 300 to the event processing node, the acquired delay time of the path from the event processing node to the event sink 400, and the measured value of response time in the event processing node. Then, the service level monitor unit 140 checks whether the measured value of the total delay time is equal to or smaller than the required response. In addition, the service level monitor unit 140 checks whether the measured value of the acquired throughput of the event processing node is equal to or greater than the required throughput.

When the events 501 necessary for event processing are transmitted by multiple different event sources 300, the service level monitor unit 140 checks whether the greatest value of the total delay time of the path among those of the paths from the respective event sources 300 to the event sink 400 is equal to or smaller than the required response.

When the maximum value does not satisfy the required service level 505 (Step S202/N), the service level monitor unit 140 instructs the node and path determination unit 120 to extract a combination of a transfer path and an event processing node different from the current combination of the transfer path and the event processing node (Step S203). The node and path determination unit 120 extracts a different combination of a transfer path and an event processing node by the same process as that in Step S103 above.

When there is a different combination of a transfer path and an event processing node in Step S203 (Step S204/Y), the service level monitor unit 140 instructs the node and path determination unit 120 to set the processing rule 503 and a transfer rule 506 for the combination of the different combination of the transfer path and the event processing node (Step S205). The node and path determination unit 120 sets again the processing rule 503 and the transfer rule 506 for the different combination of the transfer path and the event processing node by the same process as that in Step S104 and S105 above.

When there is no different combination of a transfer path and an event processing node in Step S203 (Step S204/N), the service level monitor unit 140 notifies the event sink 400 that the required service level 505 is not satisfied (is violated) (Step S206). In this case, the service level monitor unit 140 may stop the event processing by canceling the setting of the processing rule 503 and the transfer rule 506.

Subsequently, the process in Steps S201 to S206 is repeatedly performed.

With the above steps, the operation in the third exemplary embodiment of the present invention is completed.

According to the third exemplary embodiment of the present invention, the event processing system can maintain the service level required for the event processing. This is because the service level monitor unit 140 monitors whether the required service level 505 is satisfied, and, when the required service level 505 is not satisfied, the node and path determination unit 120 determines again a combination of a transfer path and an event processing node.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2012-189903, filed on Aug. 30, 2012, the disclosure of which is incorporated herein in its entirety by reference.

REFERENCE SIGNS LIST

100 Event processing control device
110 Node information acquisition unit
120 Node and path determination unit
130 Node information storing unit
140 Service level monitor unit
200 CEP node
210 Local control unit
220 Processing unit
230 Transfer unit
300 Event source
400 Event sink
501 Event
502 Event processing setting request
503 Processing rule
1503 Divided processing rule
504 Path information
505 Required service level
506 Transfer rule
1506 Local transfer rule
507 Event processing result
508 Node information
509 Node information
510 Monitor result

What is claimed is:

1. An event processing control device comprising:
a node information acquisition unit which acquires node information which includes information related to a connection destination node and performance information, from each of a plurality of nodes, the plurality of nodes each transferring an event or an event processing result to another connected node according to a transfer path, the plurality of nodes including one or more nodes each being able to perform event processing in which a received event is processed and the event processing result is generated; and
a node and path determination unit which determines a combination of an event processing node which is a node to perform the event processing and the transfer path from a source node from which an event is transmitted to a destination node to which the event processing result is transmitted, through at least the event processing node, in such a way to satisfy a specified service level, on the basis of the node information,
wherein the node and path determination unit determines, as the combination of the transfer path and the event processing node, a combination which satisfies at least one of a first condition and a second condition from among combinations of a path from the transmission source node to the transmission destination node, and a node capable of performing the event processing on the path from the transmission source node to the transmission destination node, the first condition indicating that delay time of the transfer path calculated by using the delay in transfer between the nodes on the path from the transmission source node to the transmission destination node in the combination is equal to or smaller than the required response, the second condition indicating that throughput of the node in the combination is equal to or greater than the required throughput.

2. The event processing control device according to claim 1, wherein the node and path determination unit determines, as the combination of the transfer path and the event processing node, a combination which satisfies the service level from among combinations of a path from the transmission source node to the transmission destination node, and a node capable of performing event processing on the path from the transmission source node to the transmission destination node.

3. The event processing control device according to claim 2, wherein
at least one of required response and required throughput of the event processing is specified as the service level, and the performance information includes at least one of delay in transfer from each of the plurality of nodes to another node connected to the node and throughput of the event processing of each of the plurality of nodes.

4. The event processing control device according to claim 2, wherein
the node and path determination unit sets a processing rule including a condition and a processing content related to an event to be processed, in the event processing node, and sets a transfer rule including a condition related to an event or an event processing result to be transferred and an identification of a transfer destination node, in each of the nodes on the transfer path, and
the event processing node processes the event to be processed according to the set processing rule, and the each of the nodes on the transfer path transfers the event or the event processing result to be transferred according to the set transfer rule.

5. The event processing control device according to claim 4, wherein
the processing rule is a processing rule for events from a plurality of the transmission source nodes, and
the node and path determination unit determines, as the combination of the transfer path and the event processing node, a combination which satisfies the service level, from among combinations of a path combining a plurality of first paths and a second path, and a node capable of performing the event processing on the second path, the plurality of first paths being from the plurality of respective transmission source nodes to a common node, the second path being from the common node to the transmission destination node.

6. The event processing control device according to claim 5, wherein
the processing rule can be divided into a plurality of first processing rules and a second processing rule, the plurality of first processing rules being for respective events from the plurality of the transmission source nodes, the second processing rule being for event processing results generated by using the plurality of first processing rules, and
the node and path determination unit determines, as a combination of the transfer path, event processing nodes in which the plurality of respective first processing rules are set, and the event processing node in which the second processing rule is set, a combination which satisfies the service level, from among combinations of a path combining the plurality of first paths and the second path, and the node capable of performing the event processing on each of the plurality of first paths and the node capable of performing the event processing on the second path.

7. The event processing control device according to claim 2, wherein
the plurality of nodes includes a first node movable to any one of a plurality of areas and a second node connected to the first node existing in a predetermined cover area among the plurality of areas, and
the node and path determination unit checks whether the first node and the second node are connected to each other by using information on the predetermined cover area of the second node and the area in which the first node exists, and extracts a path from the transmission source node to the transmission destination node.

8. event processing control device according to claim 3, further comprising a service level monitor unit which monitors whether the service level is satisfied, wherein,
when the service level is not satisfied, the node and path determination unit determines again the combination of the transfer path and the event processing node.

9. The event processing control device according to claim 8, wherein the service level monitor unit performs at least one of monitoring whether a measured value of the delay time of the transfer path is equal to or smaller than the required response, and monitoring whether a measured value of the throughput of the event processing measured by the event processing node is equal to or greater than the required throughput, the measured value of the delay time being calculated by using a measured value of delay time of the path from the transmission source node to the event processing node measured by the event processing node by using a time stamp inserted to an event in the transmission source node and a measured value of delay time of a path from the event processing node to the transmission destination node measured by the transmission destination node by using a time stamp inserted in the event processing result in the event processing node.

10. A node device, which is selected as an event processing node by an event processing control device, comprising:
a processing unit which performs event processing in which an event is processed and an event processing result is generated; and
a transfer unit which transfers the generated event processing result to another connected node according to a transfer path, measures first delay time, inserting a time stamp used by a transmission destination node for measuring second delay time to the generated event processing result, measures throughput of the event processing by the processing unit, and transmits a measured value of the first delay time and a measured value of the throughput of the event processing to an event processing control device,
wherein the event processing control device:
determines a combination of the event processing node which is a node to perform an event processing and the transfer path from a source node from which an event is transmitted to a destination node to which the event processing result is transmitted, through at least the event processing node, in such a way to satisfy a service level in which at least one of required response and required throughput of an event processing is specified
performs at least one of monitoring whether a measured value of the delay time of the transfer path is equal to or smaller than the required response, and monitoring whether a measured value of the throughput of the event processing measured by the event processing node is equal to or greater than the required throughput, the measured value of the delay time being calculated by using the measured value of the first delay time which is delay time of a path from the transmission source node to the event processing node and the second measured value of delay time which is delay time of a path from the event processing node to the transmission destination node, and
determines, as the combination of the transfer path and the event processing node, a combination which satisfies at least one of a first condition and a second condition from among combinations of a path from the transmission source node to the transmission destination node, and a node capable of performing the event processing on the path from the transmission source node to the transmission destination node, the first condition indicating that delay time of the transfer path calculated by using the delay in transfer between the nodes on the path from the transmission source node to the transmission destination node in the combination is equal to or smaller than the required response, the second condition indicating that throughput of the node in the combination is equal to or greater than the required throughput.

11. An event processing system comprising:
a plurality of nodes which each transfer an event or an event processing result to another connected node according to a transfer path, the plurality of nodes including one or more nodes each being able to perform event processing in which a received event is processed and the event processing result is generated; and
an event processing control device which acquires node information which includes information related to a connection destination node and performance information, from each of the plurality of nodes, and determines a combination of an event processing node which is a node to perform the event processing and the transfer path from a source node from which an event is transmitted to a destination node to which the event processing result is transmitted, through at least the event processing node, in such a way to satisfy a specified service level, on the basis of the node information,
wherein the event processing control device determines, as the combination of the transfer path and the event processing node, a combination which satisfies at least one of a first condition and a second condition from among combinations of a path from the transmission source node to the transmission destination node, and a node capable of performing the event processing on the path from the transmission source node to the transmission destination node, the first condition indicating that delay time of the transfer path calculated by using the delay in transfer between the nodes on the path from the transmission source node to the transmission destination node in the combination is equal to or smaller than the required response, the second condition indicating that throughput of the node in the combination is equal to or greater than the required throughput.

12. The event processing system according to claim 11, wherein the event processing control device determines, as the combination of the transfer path and the event processing node, a combination which satisfies the service level from among combinations of a path from the transmission source node to the transmission destination node, and a node capable of performing event processing on the path from the transmission source node to the transmission destination node.

13. The event processing system according to claim 12, wherein
　at least one of required response and required throughput of the event processing is specified as the service level, and the performance information includes at least one of delay in transfer from each of the plurality of nodes to another node connected to the node and throughput of the event processing of each of the plurality of nodes.

14. The event processing system according to claim 12, wherein
　the event processing control device sets a processing rule including a condition and a processing content related to an event to be processed, in the event processing node, and sets a transfer rule including a condition related to an event or an event processing result to be transferred and an identification of a transfer destination node, in each of the nodes on the transfer path, and
　the event processing node processes the event to be processed according to the set processing rule, and the each of the nodes on the transfer path transfers the event or the event processing result to be transferred according to the set transfer rule.

15. The event processing system according to claim 14, wherein
　the processing rule is a processing rule for events from a plurality of the transmission source nodes, and
　the event processing control device determines, as the combination of the transfer path and the event processing node, a combination which satisfies the service level, from among combinations of a path combining a plurality of first paths and a second path, and a node capable of performing the event processing on the second path, the plurality of first paths being from the plurality of respective transmission source nodes to a common node, the second path being from the common node to the transmission destination node.

16. The event processing system according to claim 15, wherein
　the processing rule can be divided into a plurality of first processing rules and a second processing rule, the plurality of first processing rules being for respective events from the plurality of the transmission source nodes, the second processing rule being for event processing results generated by using the plurality of first processing rules, and
　the event processing control device determines, as a combination of the transfer path, event processing nodes in which the plurality of respective first processing rules are set, and event processing node in which the second processing rule is set, a combination which satisfies the service level, from among combinations of a path combining the plurality of first paths and the second path, and the node capable of performing the event processing on each of the plurality of first paths and the node capable of performing the event processing on the second path.

17. The event processing system according to claim 12, wherein
　the plurality of nodes includes a first node movable to any one of a plurality of areas and a second node connected to the first node existing in a predetermined cover area among the plurality of areas, and
　the event processing control device checks whether the first node and the second node are connected to each other by using information on the predetermined cover area of the second node and the area in which the first node exists, and extracts a path from the transmission source node to the transmission destination node.

18. The event processing system according to claim 13, wherein the event processing control device monitors whether the service level is satisfied, and, when the service level is not satisfied, determines again the combination of the transfer path and the event processing node.

19. The event processing system according to claim 18, wherein
　the transmission source node inserts a time stamp to an event,
　the event processing node measures a value of delay time of the path from the transmission source node to the event processing node by using the time stamp inserted to the event, and inserts a time stamp to an event processing result,
　the event processing node measures a value of delay time of the path from the event processing node to the transmission destination node by using the time stamp inserted to the event processing result, and
　the event processing control device performs at least one of monitoring whether a measured value of the delay time of the transfer path is equal to or smaller than the required response, and monitoring whether a measured value of the throughput of the event processing measured by the event processing node is equal to or greater than the required throughput, the measured value of the delay time being calculated by using the measured value of delay time of the path from the transmission source node to the event processing node and the measured value of delay time of the path from the event processing node to the transmission destination node.

20. An event processing control method comprising:
　acquiring node information which includes information related to a connection destination node and performance information, from each of a plurality of nodes, the plurality of nodes each transferring an event or an event processing result to another connected node according to a transfer path, the plurality of nodes including one or more nodes each being able to perform event processing in which a received event is processed and the event processing result is generated; and
　determining a combination of an event processing node which is a node to perform the event processing and the transfer path from a source node from which an event is transmitted to a destination node to which the event processing result is transmitted, through at least the event processing node, in such a way to satisfy a specified service level, on the basis of the node information,
　wherein the determining determines, as the combination of the transfer path and the event processing node, a combination which satisfies at least one of a first condition and a second condition from among combinations of a path from the transmission source node to the transmission destination node, and a node capable of performing the event processing on the path from the transmission source node to the transmission destination node, the first condition indicating that delay time of the transfer path calculated by using the delay in transfer between the nodes on the path from the transmission source node to the transmission destination node in the combination is equal to or smaller than the required response, the second condition indicating that throughput of the node in the combination is equal to or greater than the required throughput.

21. The event processing control method according to claim 20, wherein, the determining determines, as the combination of the transfer path and the event processing node, a combination which satisfies the service level from among combinations of a path from the transmission source node to the transmission destination node, and a node capable of performing event processing on the path from the transmission source node to the transmission destination node.

22. The event processing control method according to claim 21, wherein
at least one of required response and required throughput of the event processing is specified as the service level, and the performance information includes at least one of delay in transfer from each of the plurality of nodes to another node connected to the node and throughput of the event processing of each of the plurality of nodes.

23. The event processing control method according to claim 21, wherein
the determining sets a processing rule including a condition and a processing content related to an event to be processed, in the event processing node, and sets a transfer rule including a condition related to an event or an event processing result to be transferred and an identification of a transfer destination node, in each of the nodes on the transfer path, and
the event processing node processes the event to be processed according to the set processing rule, and the each of the nodes on the transfer path transfers the event or the event processing result to be transferred according to the set transfer rule.

24. The event processing control method according to claim 23, wherein
the processing rule is a processing rule for events from a plurality of the transmission source nodes, and
the determining determines, as the combination of the transfer path and the event processing node, a combination which satisfies the service level, from among combinations of a path combining a plurality of first paths and a second path, and a node capable of performing the event processing on the second path, the plurality of first paths being from the plurality of respective transmission source nodes to a common node, the second path being from the common node to the transmission destination node.

25. The event processing control method according to claim 24, wherein
the processing rule can be divided into a plurality of first processing rules and a second processing rule, the plurality of first processing rules being for respective events from the plurality of the transmission source nodes, the second processing rule being for event processing results generated by using the plurality of first processing rules, and
the determining determines, as a combination of the transfer path, event processing nodes in which the plurality of respective first processing rules are set, and the event processing node in which the second processing rule is set, a combination which satisfies the service level, from among combinations of a path combining the plurality of first paths and the second path, and the node capable of performing the event processing on each of the plurality of first paths and the node capable of performing the event processing on the second path.

26. The event processing control method according to claim 21, wherein
the plurality of nodes includes a first node movable to any one of a plurality of areas and a second node connected to the first node existing in a predetermined cover area among the plurality of areas, and
the determining checks whether the first node and the second node are connected to each other by using information on the predetermined cover area of the second node and the area in which the first node exists, and extracts a path from the transmission source node to the transmission destination node.

27. The event processing control method according to claim 22, further comprising:
monitoring whether the service level is satisfied, and
determining again the combination of the transfer path and the event processing node, when the service level is not satisfied.

28. The event processing control method according to claim 27, wherein the monitoring performs at least one of monitoring whether a measured value of the delay time of the transfer path is equal to or smaller than the required response, and monitoring whether a measured value of the throughput of the event processing measured by the event processing node is equal to or greater than the required throughput, the measured value of the delay time being calculated by using a measured value of delay time of the path from the transmission source node to the event processing node measured by the event processing node by using a time stamp inserted to an event in the transmission source node and a measured value of delay time of a path from the event processing node to the transmission destination node measured by the transmission destination node by using a time stamp inserted in the event processing result in the event processing node.

29. A non-transitory computer readable storage medium recording thereon a program, causing a computer to perform a method comprising:
acquiring node information which includes information related to a connection destination node and performance information, from each of a plurality of nodes, the plurality of nodes each transferring an event or an event processing result to another connected node according to a transfer path, the plurality of nodes including one or more nodes each being able to perform event processing in which a received event is processed and the event processing result is generated; and
determining a combination of an event processing node which is a node to perform the event processing and the transfer path from a source node from which an event is transmitted to a destination node to which the event processing result is transmitted, through at least the event processing node, in such a way to satisfy a specified service level, on the basis of the node information,
wherein the determining determines, as the combination of the transfer path and the event processing node, a combination which satisfies at least one of a first condition and a second condition from among combinations of a path from the transmission source node to the transmission destination node, and a node capable of performing the event processing on the path from the transmission source node to the transmission destination node, the first condition indicating that delay time of the transfer path calculated by using the delay in transfer between the nodes on the path from the transmission source node to the transmission destination node in the combination is equal to or smaller than the required response, the second condition indicating that throughput of the node in the combination is equal to or greater than the required throughput.

30. An event processing control device comprising:
a node information acquisition means for acquiring node information which includes information related to a connection destination node and performance information, from each of a plurality of nodes, the plurality of nodes each transferring an event or an event processing result to another connected node according to a transfer path, the plurality of nodes including one or more nodes each being able to perform event processing in which a received event is processed and the event processing result is generated; and a node and path determination means for determining a combination of an event processing node which is a node to perform the event processing and the transfer path from a source node from which an event is transmitted to a destination node to which the event processing result is transmitted, through at least the event processing node, in such a way to satisfy a specified service level, on the basis of the node information, wherein the node and path determination means determines, as the combination of the transfer path and the event processing node, a combination which satisfies at least one of a first condition and a second condition from among combinations of a path from the transmission source node to the transmission destination node, and a node capable of performing the event processing on the path from the transmission source node to the transmission destination node, the first condition indicating that delay time of the transfer path calculated by using the delay in transfer between the nodes on the path from the transmission source node to the transmission destination node in the combination is equal to or smaller than the required response, the second condition indicating that throughput of the node in the combination is equal to or greater than the required throughput.

\* \* \* \* \*